US012570187B2

(12) United States Patent
Hendrickson et al.

(10) Patent No.: US 12,570,187 B2
(45) Date of Patent: Mar. 10, 2026

(54) ADJUSTABLE CREEPER

(71) Applicant: T & L DESIGN, LLC, Corinne, UT (US)

(72) Inventors: Joel Hendrickson, Corinne, UT (US); Travis Hendrickson, Corinne, UT (US)

(73) Assignee: T&L DESIGN, LLC, Corinne, UT (US)

( * ) Notice: Subject to any disclaimer, the term of this patent is extended or adjusted under 35 U.S.C. 154(b) by 529 days.

(21) Appl. No.: 18/193,392

(22) Filed: Mar. 30, 2023

(65) Prior Publication Data

US 2024/0326660 A1 Oct. 3, 2024

(51) Int. Cl.
| | |
|---|---|
| *B25H 5/00* | (2006.01) |
| *A47C 3/36* | (2006.01) |
| *B60N 2/16* | (2006.01) |
| *B60N 2/22* | (2006.01) |
| *B60N 2/23* | (2006.01) |

(52) U.S. Cl.
CPC .............. *B60N 2/164* (2013.01); *A47C 3/36* (2013.01); *B25H 5/00* (2013.01); *B60N 2/22* (2013.01); *B60N 2/23* (2013.01); *B60N 2002/2204* (2013.01)

(58) Field of Classification Search
CPC . B60N 2/164; B60N 2/22; B60N 2/23; B25H 5/00; B62B 2202/42; A47C 9/02
See application file for complete search history.

(56) References Cited

U.S. PATENT DOCUMENTS

| | | | | |
|---|---|---|---|---|
| 4,125,242 | A | * 11/1978 | Meiller .................. | B60N 2/544 248/525 |
| 4,741,512 | A | * 5/1988 | Elkuch .................... | B66F 7/065 D34/28 |
| 4,894,876 | A | * 1/1990 | Fenwick ............ | A61G 13/0009 5/602 |

(Continued)

FOREIGN PATENT DOCUMENTS

| | | | | |
|---|---|---|---|---|
| CN | 110153977 A | * | 8/2019 | .............. B25H 5/00 |
| CN | 112425946 A | * | 3/2021 | .............. A47C 3/36 |

(Continued)

OTHER PUBLICATIONS https://ezcreeper.com/model-m/.
https://personalpositioningtechnologies.com.
https://store.bendpak.com/ergochairergo-rs/.

*Primary Examiner* — Steve Clemmons
(74) *Attorney, Agent, or Firm* — DORSEY & WHITNEY LLP

(57) ABSTRACT

An apparatus can include a seat, a backrest, a base frame comprising wheels and an adjustment assembly. The adjustment assembly can be adjustable from a lowered position to a raised position. The adjustment assembly can include an actuator assembly, pairs of scissor legs, and a connector. The actuator assembly can include: an actuator positioned underneath the seat, where the actuator comprises an actuatable shaft; and biasers positioned underneath the backrest. In addition, the connector can be attached to the pairs of scissor legs and the actuatable shaft, the connector being configured to: compress the biasers upon extension of the actuatable shaft away from actuator; and decompress the biasers upon retraction of the actuatable shaft towards the actuator.

20 Claims, 15 Drawing Sheets

(56) References Cited

U.S. PATENT DOCUMENTS

| | | | |
|---|---|---|---|
| 4,895,380 | A | 1/1990 | Brooks et al. |
| 4,957,302 | A | 9/1990 | Maxwell |
| 5,261,725 | A | 11/1993 | Rudolph |
| 5,707,067 | A | 1/1998 | Smith |
| RE35,732 | E | 2/1998 | Shockley |
| D398,124 | S | 9/1998 | Schultz et al. |
| 6,199,877 | B1 | 3/2001 | Shockley |
| 6,425,590 | B1 | 7/2002 | Whiteside et al. |
| 6,834,868 | B1 | 12/2004 | Blackburn |
| 6,908,154 | B2 * | 6/2005 | Aono .................... A61G 7/1059 |
| | | | 297/354.13 |
| 6,912,746 | B2 * | 7/2005 | Grove .................. A61G 7/0514 |
| | | | 5/624 |
| 6,969,077 | B2 | 11/2005 | Liu |
| 7,025,421 | B1 | 4/2006 | Fowler et al. |
| 7,070,189 | B2 * | 7/2006 | Grauss .................... B25H 5/00 |
| | | | 280/32.6 |
| 7,341,310 | B1 * | 3/2008 | Ross ........................ A47C 3/36 |
| | | | 297/344.17 |
| 7,481,438 | B2 | 1/2009 | Hernandez |
| 8,777,237 | B2 | 7/2014 | Brittingham et al. |
| 9,193,064 | B2 | 11/2015 | Dall'Armi et al. |
| 10,661,431 | B1 * | 5/2020 | Hightower ............... B25H 5/00 |
| D903,220 | S | 11/2020 | Hendrickson et al. |
| D1,013,314 | S * | 1/2024 | Kritzer ........................... D34/23 |
| 12,004,656 | B2 * | 6/2024 | Brittingham ............. A47C 3/36 |
| 12,318,910 | B2 * | 6/2025 | Connell ................... B25H 5/00 |
| 12,358,124 | B2 * | 7/2025 | Spainhower ............. B25H 5/00 |
| 2002/0125662 | A1 * | 9/2002 | Magness ................. B66F 5/025 |
| | | | 280/30 |
| 2008/0157492 | A1 | 7/2008 | Chaykin et al. |
| 2009/0172883 | A1 | 7/2009 | Benedict et al. |
| 2012/0235371 | A1 | 9/2012 | Smith |
| 2014/0339783 | A1 | 11/2014 | Dall'Armi et al. |
| 2016/0039088 | A1 * | 2/2016 | Blasjo ..................... B25H 5/00 |
| | | | 280/32.6 |
| 2018/0222037 | A1 | 8/2018 | Hendrickson et al. |
| 2019/0337548 | A1 * | 11/2019 | Colton .................. B62B 5/0053 |

FOREIGN PATENT DOCUMENTS

| | | | | |
|---|---|---|---|---|
| DE | 19927314 | A1 * | 12/2000 | ............... B25H 5/00 |
| DE | 102004026036 | B4 * | 3/2006 | ............. B60N 2/505 |
| JP | 3119184 | B2 * | 12/2000 | ............... B25H 5/00 |

* cited by examiner

100

100

100

ADJUSTABLE CREEPER

FIELD

The described examples relate generally to adjustable creepers. In particular examples, the disclosure relates to a powered creeper that is adjustable via motorized actuation between raised and lowered positions.

BACKGROUND

Creeper devices are widely used in repair shops and factories to allow an operator to lay in a low position to work underneath or around automobiles or other equipment. Many times, operators are required to be at different heights to work around automobiles, airplanes or other equipment. Thus, adjustability of creepers can be desirable in many situations. Unfortunately, many creepers only have discrete adjustment settings for height (e.g., first, second, and third height positions). Moreover, most creepers are not adjustable while a user is still positioned on the creeper-lending to a poor user experience, bodily strain to compensate for poor positioning, and inefficient use of time and energy. Further, depending on the allotted work space, a user may be physically incapable of getting off the creeper to adjust a height of the creeper-which leads to incompatibility for particular types of projects. In a similar vein, some users may be less mobile or perhaps handicapped, in which case conventional adjustment requiring a user to get off of the creeper is incompatible with these users.

A certain few creepers exist in the art that can provide adjustability while the user maintains a position on the creeper. However, such creepers have a variety of drawbacks. For example, one conventional creeper is adjustable via a manual hand pump, which is slow and requires tremendous user energy to operate-especially when repeatedly changing positions. Another conventional creeper is overly complex, with several dozens of hinges, linkages and custom components configured to articulate along numerous planes and angles. Moreover, this conventional creeper is prone to myriad repair and maintenance issues (along with prohibitive costs to manufacture and sell to a large market of consumers). Furthermore, even adjustable creepers tend to have poor levels of user comfort, especially after long durations of use. For instance, conventional adjustable creepers cannot automatically adjust a seat inclination to help with pressure distribution along a user's bottom and help prevent a user from sliding off the seat.

The subject matter claimed herein is not limited to examples that solve any disadvantages or that operate only in environments such as those described above. Rather, this background is only provided to illustrate one example technology area where some examples described herein may be practiced.

SUMMARY

An aspect of the present disclosure relates to an adjustable creeper. In some examples, the adjustable creeper can include a seat, the seat support member including a cam surface. The adjustable creeper can further include a backrest and a base frame, the base frame including four wheels, a movable axle, and an adjustment assembly. The adjustment assembly can include a continuous range of adjustment resolution to adjust the seat and the backrest from a lowered position to a raised position. In these or other examples, the adjustment assembly includes: an actuator assembly configured for motorized actuation; a first pair of legs with a first end connected to the backrest, and a second end opposite the first end, the second end being rotatably anchored to the base frame; and a second pair of legs that includes a first end portion comprising a roller configured to engage the cam surface of the seat support member, and a second end connected to the movable axle of the base frame.

In some examples, the cam surface comprises a crest portion and a trough portion. In at least one example, when the roller engages the crest portion, the seat and the backrest are positioned between the lowered position and the raised position. Further, in some examples, when the roller engages the crest portion, the seat comprises a steeper angle than at least a first angle corresponding to the lowered position.

In certain implementations, the actuator assembly includes: a bracket; a hydraulic actuator positioned between the bracket; a motor electrically coupled to the hydraulic actuator; a set of springs; and a set of dowels disposed within the set of springs. In some examples, each dowel of the set of dowels includes: a fixed end connected to the bracket; and a free end with a mechanical stop. In certain examples, each first end portion of the second pair of legs is connected to the bracket.

In at least one example, the adjustable creeper further includes a movable joint extending between the first pair of legs, the movable joint defining a pair of through holes penetrated by the set of dowels. In some examples, the movable joint is translatable along the set of dowels to: bias the set of springs when the adjustment assembly transitions from the raised position to the lowered position; and unbias the set of springs when the adjustment assembly transitions from the lowered position to the raised position.

Another aspect of the present disclosure relates to an apparatus with a seat, a backrest, a base frame with wheels, and an adjustment assembly adjustable from a lowered position to a raised position. The adjustment assembly can include an actuator assembly, biasers positioned underneath the backrest, pairs of scissor legs, and a connector attached to the pairs of scissor legs and the actuatable shaft. In certain examples, the actuator assembly is positioned underneath the seat and includes an actuatable shaft. Further, in some examples, the connector is configured to: compress the biasers upon extension of the actuatable shaft away from the actuator; and decompress the biasers upon retraction of the actuatable shaft towards the actuator.

In at least one example, the actuator assembly includes: an actuator mount connected to the actuator; and a set of dowels positioned inside the biasers and extending to the actuator mount. In one or more examples, the set of dowels extend through the connector, the connector separating the biasers and the actuatable shaft. In particular implementations, the actuatable shaft is actuatable in and out of a first end of the actuator; and the actuator mount is connected to a second end of the actuator opposite the first end, the actuator mount being parallel to the actuatable shaft. In some examples, each scissor leg of the pairs of scissor legs comprises a single, continuous support member. In at least one example, the actuator assembly further includes a motor connected to the actuator, the motor being positioned underneath the actuator between the actuator and a ground surface.

Yet another aspect of the present disclosure relates to an apparatus that includes: seat; a backrest; a base assembly, an electrically powered actuator assembly, and a support assembly. In some examples, the base assembly includes: a front portion; a back portion; and a movable axle translatable along the base assembly between the front portion and the back portion. In particular examples, the electrically powered actuator assembly includes: a hydraulic actuator with an adjustable shaft; a motor; a bracket positioned adjacent to each side of at least one of the hydraulic actuator or the motor, the bracket supporting at least one end of the hydraulic actuator or the motor opposite the adjustable shaft; a set of support rods connected to the bracket; and raise-assist members comprising central axes positionally aligned with the set of support rods.

The support assembly can be movably attached to the seat, the backrest, the base assembly, and the electrically powered actuator assembly, the support assembly including a first pair of support members and a second pair of support members. Each support member of the first pair of support members can include: a first end connected to the backrest; and a second end opposite the first end, the second end being rotatably connected to the front portion of the base assembly. The second pair of support members can be positioned parallel to each other and form a scissor connection with the first pair of support members, each support member of the second pair of support members, including: a first end connected to the bracket; and a second end connected to a movable axle.

In some examples, the seat includes a bottom surface with cammed portions; and each support member of the second pair of support members includes a roller attached to the first end, the roller configured to engage one of the cammed portions. In certain examples, the seat includes a top surface with a variable angle relative to the backrest based on engagement between the rollers and the cammed portions. In at least some examples, the raise-assist members are configured to provide a return bias against the adjustable shaft via a spring force applied at a moment arm away from the scissor connection. In one or more examples, the first end of the second pair of support members is connected to the bracket at a pivot point positioned a distance away from the scissor connection, the distance being equivalent to the moment arm.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figures 1, 2:
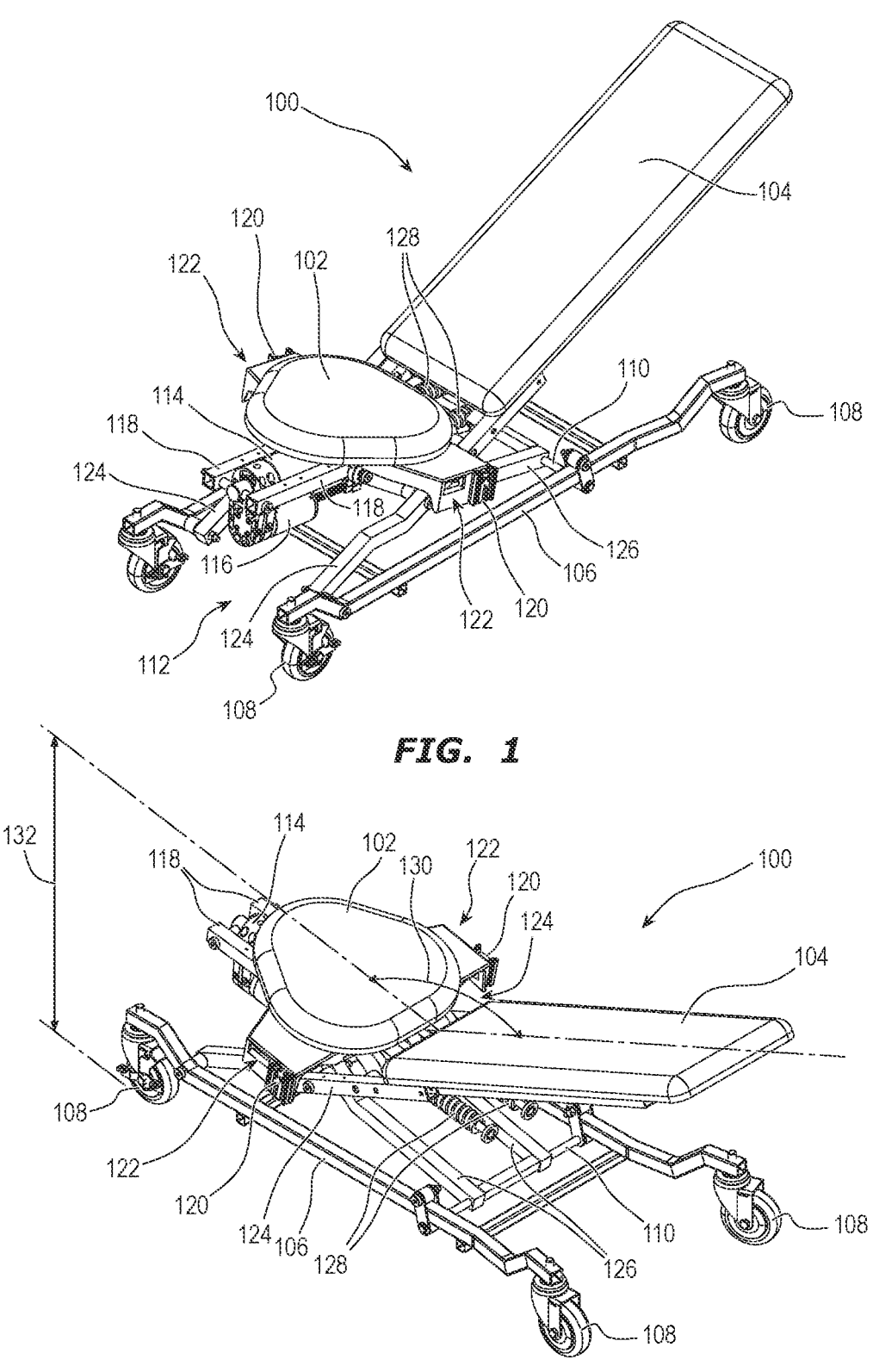
FIGS. 1-2 respectively illustrate top front perspective and top rear perspective views of an example creeper.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

The following disclosure relates to a wheeled work chair (e.g., a creeper) that can raise and lower via motorized operation. For example, the creeper of the present disclosure can include a hydraulic actuator that can quickly adjust a creeper height (and inclination) between a relatively flat (e.g., lowered) position and an upright (e.g., raised or chair-like) position. Of course, with continuous adjustment resolution, positional adjustment as disclosed herein includes adjustment to any intermediate or reclined position between the flat and upright positions. The creeper of the present disclosure is also powerful enough to adjust a height positioning while the operator is positioned on the creeper, lending to improved user experiences and compatibility with myriad different workspaces and operators.

The creeper of the present disclosure can also leverage a design to articulate the creeper in a more comfortable manner compared to conventional creeper devices. For example, the creeper of the present disclosure can include a cam surface that, in response to engagement (e.g., via a roller), can automatically vary the seat angle during the height adjustment process. Alternatively, the creeper can include seat articulation (e.g., seat angle adjustment) via a four-bar linkage. Such automatic seat adjustment can help alleviate or eliminate pressure points (e.g., around a tail bone area, the sit bones area, a lower pelvis region, or a glute region) that prolonged work sessions can induce on conventional creepers. Likewise, such automatic seat adjustment can help better support a user's weight based on the varying positioning of the backrest during height adjustment.

Further, the disclosed creeper embodiments can include fewer components and less moving parts compared to some conventional creepers. This improved, simplified design can thus include fewer points of failure and reduced maintenance issues compared to some conventional designs. As an example, the creeper of the present disclosure can include a lift design that incorporates a robust scissor action performed by a motorized actuator and assisted by biasers (e.g., springs). In this example, the motorized actuator can pull creeper legs together while biasers push the creeper legs together-which in combination creates a lifting effect for the creeper. In some examples of raising the creeper from the flat or lowered position, the biasers can reduce peak actuator loads when the scissor legs of the creeper are farthest apart. By contrast, the motorized actuator can push the creeper legs apart (thereby compressing the biasers and storing potential energy) when lowering the creeper. In certain implementations, the creeper legs include single, continuous members that pivot about a scissor connection.

These and other examples are discussed below with reference to FIGS. 1-24. However, a person of ordinary skill in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figures 3, 4:
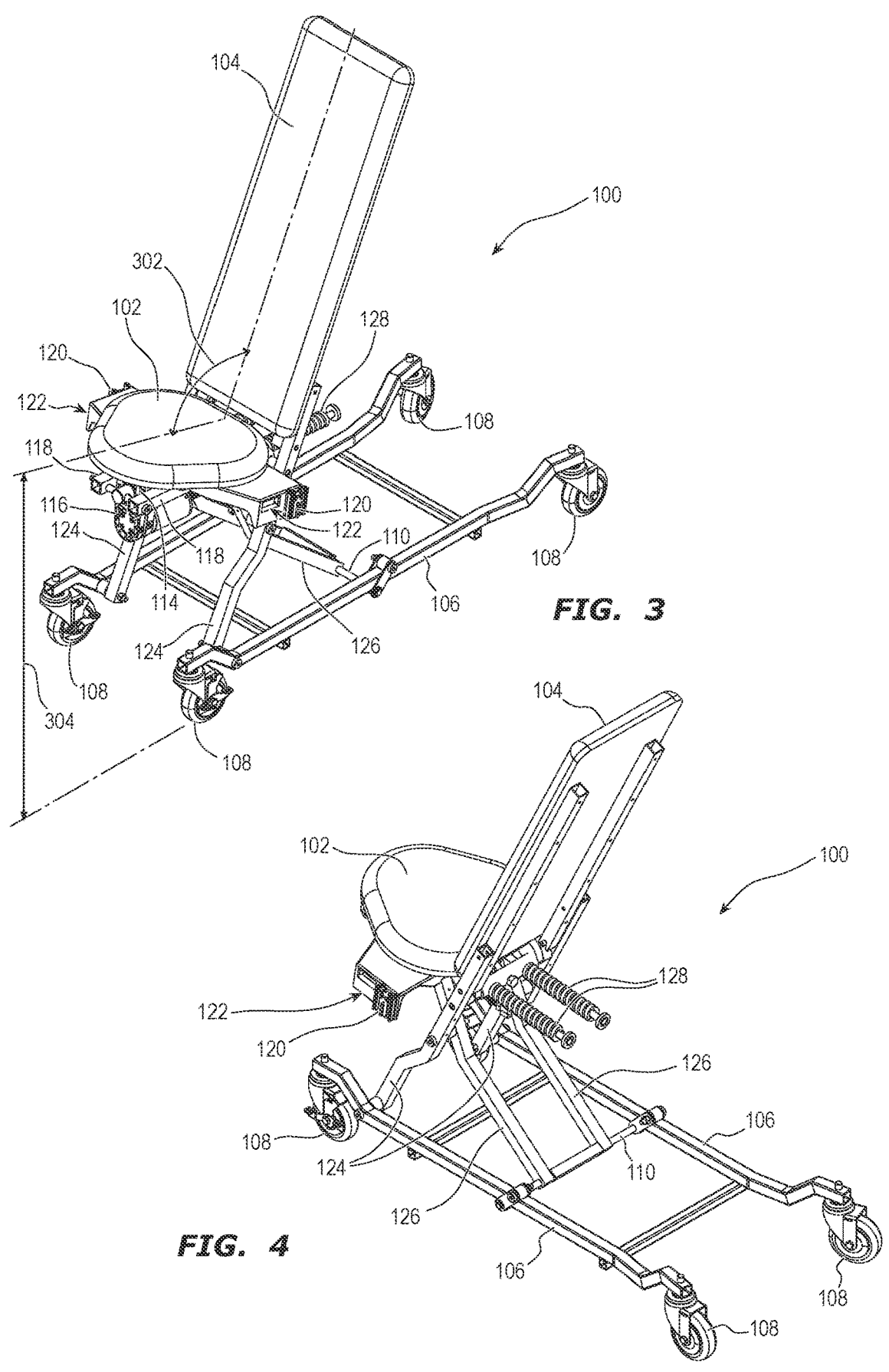
FIGS. 3-4 respectively illustrate top front and top rear perspective views of an example creeper in a raised position.
Figure 5:
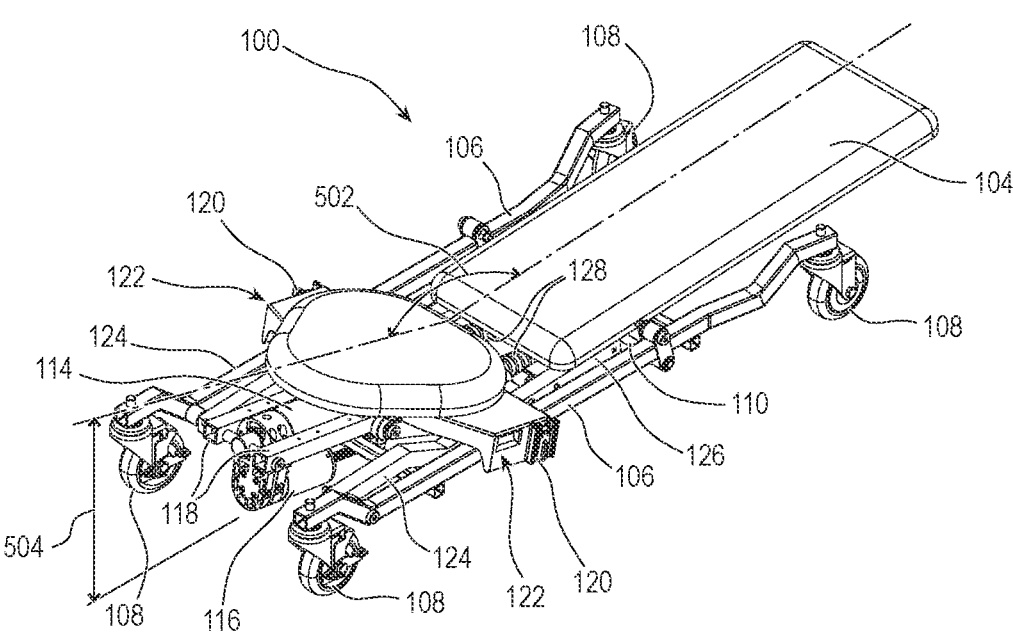
FIGS. 5-6 respectively illustrate top front and top rear perspective views of an example creeper in a lowered position.
Figure 6:
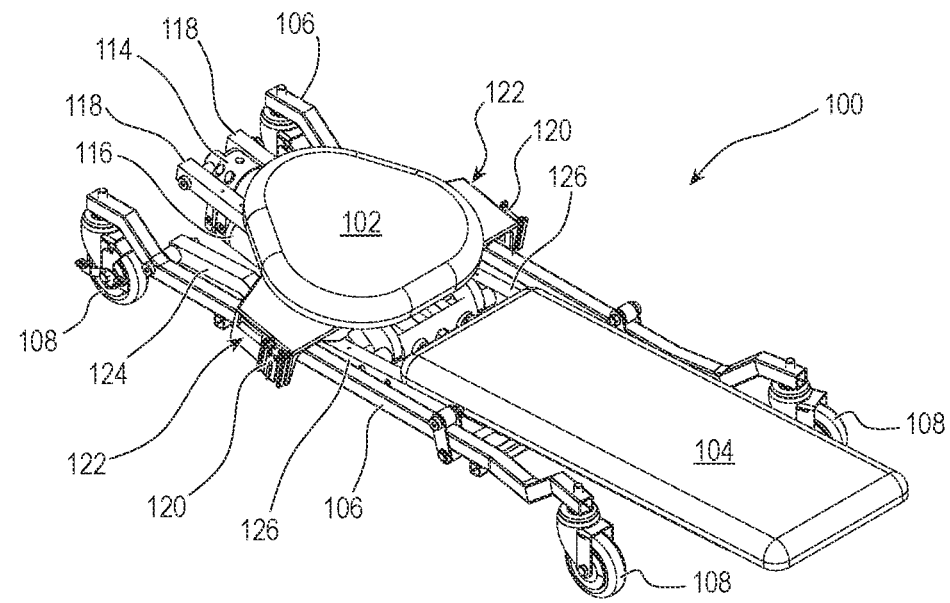

FIGS. 1-2 respectively illustrate front perspective and rear perspective views of an adjustable creeper (hereafter, "creeper") in accordance with one or more examples of the present disclosure. As shown, a creeper 100 includes a seat 102, a backrest 104, and a base frame 106. The seat 102 and the backrest 104 can adjust relative to the base frame 106. For example, the seat 102 and the backrest 104 can raise and lower in height relative to the base frame 106. Additionally, the seat 102 and the backrest 104 can articulate or pivot relative to one another to adjust an angle of inclination. Indeed, as depicted in FIGS. 1-2, the seat 102 is positioned at a first height 132, and the backrest 104 is rotated partially upwards at a first angle 130 relative to the seat 102. In these or other examples, the first angle 130 and the first height 132 can correspond to a variety of different intermediate seat and backrest positions between a raised position (e.g., as shown in FIGS. 3-4) and a lowered position (e.g., as shown in FIGS. 5-6).

As used herein, the term "seat" refers to a lower body support (e.g., for sitting thereon). In some examples, a seat can include a hard surface or a rigid backing (e.g., to help maintain structural integrity as well as support the weight of a user). In at least some examples, a seat is sized, shaped, and/or contoured to contact the glutes or upper hamstrings of a user. In particular examples, a seat includes a cushioned layer, such as a foam layer and/or upholstery layer, positioned over a rigid backing (e.g., to help provide increased comfort).

Further, as used herein, the term "backrest" refers to an upper body support (e.g., for laying back thereon). Like a seat, a backrest can include a hard surface or rigid backing. In certain cases, a backrest can additionally include a cushioned layer and/or upholstery layer. A backrest can also be sized, shaped, and/or contoured to contact a back of a user (e.g., along any length or portion from the waist up to the head of a user). In some examples, a detachable head rest can be removed and reattached to the backrest (e.g., via a strap, fastener, or mechanical connection), as may be desired.

Beneath the seat 102 and the backrest 104 lies the base frame 106. As used herein, the term "base frame" refers to a support structure that maintains the creeper 100 above a ground surface. The base frame 106 can thus include various support arms, axles (e.g., a movable axle 110), chassis members, and the like. In particular examples, the creeper 100 is a movable creeper. In such a case, the base frame 106 includes wheels 108, thereby allowing the base frame 106 (and therefore the creeper 100) to roll across a ground surface. Although the creeper 100 is shown in a 4-wheel configuration, other configurations are herein contemplated (e.g., two front wheels and a single rear wheel). However, in a 4-wheel configuration, the creeper 100 can provide improved stability compared to certain conventional creepers having fewer wheels.

In these or other examples, the wheels 108 can provide increased creeper mobility underneath and around objects within a workspace. Myriad different types of wheels can be implemented. In specific implementations, the wheels 108 include caster wheels (e.g., swivel caster wheels with automatic and/or manual locking capability). In certain implementations, the wheels 108 include hollow kingpin caster wheels attached to the base frame 106 via button head bolts (e.g., to reduce a profile height from component stacking and provide a lower profile for the creeper 100).

The creeper 100 further includes a first pair of legs 124 and a second pair of legs 126. As used herein, the terms "legs," "pairs of legs," "support members," or "support assembly" refer to connecting members that connect the base frame 106 to at least one of the seat 102 or the backrest 104. In addition, legs can include a variety of shapes, sizes, cross-sections, gauge (or thickness), and materials. In at least one example, legs can include ⅛ inch or 1/16 inch stainless steel tubes with circular, square, or rectangular cross-section defining a hollow center. In certain implementations, legs can include a single, continuous support member devoid of intermediate attachments or connecting components. Pairs of legs can also be arranged in a variety of ways (e.g., forming a scissor connection, a 4-bar linkage). In at least one example, each leg in a pair of legs is arranged in a parallel fashion relative to the other leg. In some embodiments, legs of the present disclosure can include certain bends, curvature, angles, and/or dimensions that help to position the seat 102 and the backrest 104 in a desired position.

In particular implementations, the first pair of legs 124 and the second pair of legs 126 movably support the seat 102 and the backrest 104. For example, as will be discussed below, the first pair of legs 124 and the second pair of legs 126 can move relative to each other and thereby cause the seat 102 and the backrest 104 to correspondingly adjust.

To illustrate, the creeper 100 includes an adjustment assembly 112 to actuate at least one of the first pair of legs 124 and the second pair of legs 126 relative to each other. In so doing, the adjustment assembly 112 can raise and lower the seat 102 and the backrest 104, as well as adjust corresponding angles for the seat 102 and the backrest 104. In particular implementations, the adjustment assembly 112 includes a continuous range of adjustment resolution. As used herein, the term "continuous range of adjustment resolution" refers to positional values in terms of height and/or angle that can equate to any number of values between a raised and lowered position. For example, unlike discrete position settings of some conventional creepers, the adjustment assembly 112 can move to any desired position between a raised position and a lowered position. In other words, a continuous range of adjustment resolution is not bound to certain (e.g., predetermined) intermediate position settings. Of course, the term "continuous" should not be interpreted as necessarily requiring an infinite number of position settings because actuators known in the art do not have infinite adjustment resolution. Instead, actuators commonly actuate in a pseudo-continuous manner via finely-tuned increments (e.g., increments of micrometers, millimeters, centimeters, inches, etc.).

In these or other examples, an adjustment assembly (or an electrically powered actuator assembly) can include an actuator 114, a motor 116, a bracket 118, and biasers 128. As used herein, the term "actuator" refers to a variety of components, whether mechanical, electromechanical, hydraulic, pneumatic, piezoelectric, etc., that can generate controlled motion via energy and/or signals (e.g., electrical signals). The controlled motion can, in some examples, include rotary motion or linear motion. These or other actuators can include actuatable shafts, toggles, latches, ratchets, clamps, friction brakes, toothed brakes, hydraulic brakes, pneumatic bladders, non-back-drivable mechanisms, etc. Additionally or alternatively, actuators can include (or at least control movement of) certain components, such as bearings/bushings, dovetail slides, scissor mechanisms, sarrus linkages, gears (e.g., worm gears, rotary gears), movable arms, winches, cables (e.g., tensioned cables), locking mechanisms, etc. In particular embodiments, an actuator includes an electro-hydraulic linear actuator with an actuatable shaft (e.g., a piston) that moves in and out relative to the actuator housing. Additionally, and as will be described in more detail below in relation to subsequent figures, the actuatable shaft of the actuator can movably connect the first pair of legs 124 and the second pair of legs 126.

More particularly, the motor 116 can drive an actuator of the present disclosure. The motor 116 specifically can replace manual actuation common in some conventional creepers (e.g., hand pumping). As used herein, the term "motor" refers to an electric motor. Examples of an electric motor include an alternating current brushless motor, direct current (DC) brushed motor, DC brushless motor, direct drive motor, linear motor, servo motor, stepper motor, etc. Some specific examples of a DC motor include a DC shunt motor, separately excited motor, DC series motor, permanent magnet DC motor, DC compound motor, etc. Some specific examples of an AC motor include a synchronous motor or induction motor. Other examples of an electric motor include a reluctance motor, universal motor, or hysteresis motor.

In these or other examples, the electric motor of the present disclosure can be powered via a variety of one or more power supplies. As used herein, the term "power supply" refers to any power source that supplies power to one or more components of the creeper 100 (e.g., to charge a battery and/or power the motor 116). For example, a power supply can include fuel cells, battery cells, generators, alternators, solar power converters, motion-based converters (e.g., that convert vibrations or oscillations into power), etc. In particular implementations, a power supply can convert alternating current to direct current (or vice-versa) for charging or recharging components of the creeper 100. Some particular examples of a power supply can include a switched mode power supply, an uninterruptible power supply, an alternating current power supply, a direct current power supply, a regulated power supply, a programmable power supply, a computer power supply, and a linear power supply.

In at least one example, a power supply includes a battery (e.g., a 28-volt rechargeable battery) that can mount onto battery mount(s) 120. As shown, the battery mount(s) 120 include two battery mounts positioned on opposite sides of the creeper 100. In this example, one power supply can mount to a first battery mount, and a second power supply can mount to a second battery mount. In such an example, a single power supply can power the motor 116, while the other power supply serves as a backup power supply. In other examples, multiple power supplies can simultaneously power the motor 116. Regardless, the battery mount(s) 120 can be in electrical communication with the motor 116 to provide power. In at least some examples, the battery mount(s) 120 include internal tunnel paths for wiring. Thus, in certain implementations, the battery mount(s) 120 can be 3D-printed to provide custom wiring paths between the motor 116 and the electrical contacts of the battery mount(s) 120.

Relatedly, a switch 122 can control the provisioning of power from the battery (and the associated electrical contacts of the battery mount(s) 120) to the motor 116. For example, user input to a switch can cause electrical circuitry (e.g., an electrical gate) to close and allow power to flow to the motor 116 from the battery (and the electrical contacts of the battery mount(s) 120). In these or other examples, a switch can include a variety of different controls, such as levers, buttons, dials, rockers, sliders, toggles, joysticks, etc. In particular implementations, a switch 122 is positioned on each side of the creeper 100, and simultaneous activation of both switches may be required in order to raise or lower the creeper 100 (e.g., in compliance with certain safety standards to avoid incidental raising or lowering of the creeper 100). For example, the switch 122 on one side of the creeper 100 may be wired in series with the switch 122 on the other side of the creeper 100. Likewise, in some implementations, an orientation of the switch 122 and/or a cover housing positioned over the switch 122 can help avoid falling objects from incidentally triggering the switch 122.

In these or other examples, the adjustment assembly 112 is positioned underneath at least one of the seat 102 or the backrest 104. In particular, the actuator 114 can be positioned underneath the seat 102. Likewise, the motor 116 can also be positioned underneath the seat 102. In specific implementations, the motor 116 is connected to the actuator 114. In certain examples, the motor 116 is positioned underneath the actuator 114 between the actuator 114 and a ground surface. In other examples, the motor 116 is positioned laterally adjacent to the actuator 114. In certain examples, a positional configuration of the actuator 114 and the motor 116 can depend on an amount of clearance between the ground surface and the seat 102.

In some examples, a bracket 118 mounts at least one of the actuator 114 or the motor 116 to the creeper 100. As used herein, the term "bracket" refers to a mounting structure, a stabilizing structure, an anchoring structure, etc. A bracket can include a variety of members and associated configurations. In particular embodiments, however, a bracket includes a fixed, rigid member positioned laterally adjacent to at least one of the actuator 114 or the motor 116. Further, in some embodiments, a bracket includes a fixed, rigid member positioned parallel to an actuatable shaft (not shown) of the actuator 114. In at least one example, a bracket includes a fixed, rigid member that is coplanar with the actuatable shaft and its corresponding central longitudinal axis. As an example shown in the figures, the bracket 118 on each side of the actuator 114 is mounted to a first end of the actuator 114 (opposite a second end out of which proceeds an actuatable shaft).

The adjustment assembly 112 further includes biasers 128. As used herein, the terms "biasers," which can also be called bias members, and "raise-assist members" refer to components capable of storing potential mechanical energy. In some examples, a biaser or a raise-assist member stores elastic potential energy or gravitational potential energy. Certain implementations of a biaser or a raise-assist member include a tensionable or compressible object, such as a spring or elastic band. However, other examples of a biaser or a raise-assist member include flywheels, compressed air energy storage, liquid air energy storage, etc. It will also be appreciated that, in some embodiments, the biasers 128 can be implemented together with one or more dampers (e.g., to better control the descent of the creeper 100).

In these or other examples, the biasers 128 can help actuate at least one of the first pair of legs 124 or the second pair of legs 126. Indeed, as will be described below, the biasers 128 can provide increased lifting power for the creeper 100, particularly when the creeper 100 is initially transitioning from a lowered position (as shown in FIGS. 5-6) to a raised position (as shown in FIGS. 3-4). For example, the biasers 128 can store potential energy when the creeper 100 is in a lowered position. That potential energy can be converted to kinetic energy as the creeper 100 raises from the lowered position.

The biasers 128 can include a variety of different positions and configurations. In some examples, the biasers 128 are aligned parallel to (and adjacent) the actuatable shaft of the actuator 114. In this manner, the biasers 128 can push or decompress in a same direction in which the actuatable shaft retracts into the actuator 114—lending to increased lift efficiency.

Although FIGS. 1-2 (and other figures) illustrate the creeper 100 as including two biasers, it will be appreciated that the creeper 100 can include a single biaser, or in other cases, three or more biasers. In at least some examples, however, multiple biasers can provide increased lift efficiency by providing greater stored potential energy when compressed in the lowered position. This greater storage of potential energy can decrease peak loads experienced by the actuator 114 (e.g., to actuate the actuatable shaft) when transitioning from the lowered position.

FIGS. 3-4 respectively illustrate front and rear perspective views of the creeper 100 in accordance with one or more examples of the present disclosure. In particular, FIGS. 3-4 illustrate the creeper 100 being positioned in a raised configuration. For example, at a raised position, the creeper 100 includes a second angle 302. Like the first angle 130 shown in FIG. 2, the second angle 302 is also defined by a position of the seat 102 and the backrest 104. However, the second angle 302 is comparatively steeper than the first angle 130. In particular, the backrest 104 at the second angle 302 is positioned at a more upright or more vertical position compared to the first angle 130 shown in FIGS. 1-2.

In some examples, the second angle 302 comprises a minimum or steepest angle positionable within a range of motion for the creeper 100. In particular examples, the second angle 302 is about 90 degrees to about 130 degrees. In specific implementations, the second angle 302 is about 105 degrees to about 120 degrees.

In some embodiments, the foregoing angle ranges are not mere design choices. At least the foregoing angle ranges can be important in certain scenarios (e.g., to help some users more easily exit off the creeper 100). For instance, some users (e.g., elderly users or handicapped users) may be unable to exit off the creeper 100 when in a more reclined position (as shown in FIGS. 1-2) and the lowered position (shown in FIGS. 5-6). Additionally, some users may be prone to more bodily strain from prolonged or repeated exiting from a non-raised position (i.e., at angles outside of the foregoing ranges).

As further shown in FIGS. 3-4, the creeper 100 at the raised position includes a second height 304. Like the first height 132 shown in FIG. 2, the second height 304 is also defined by a position of the seat 102 relative to a ground surface. However, the second height 304 is comparatively higher than the first height 132.

In some examples, the second height 304 comprises a maximum or largest seat height positionable within a range of motion for the creeper 100. In particular examples, the second height 304 is about 1 feet to about 4 feet. In specific implementations, the second height 304 is about 2 feet to about 3.5 feet. At least the foregoing height ranges are also not mere design choices. For example, at least the foregoing height ranges can be important for a user to comfortably reach (while seated on the creeper 100) higher objects in a workspace, such as the body or wing of a propeller airplane.

Additionally shown in FIGS. 3-4, the biasers 128 are uncompressed when the creeper 100 is in the raised position. The actuatable shaft of the actuator 114 has retracted into the housing of the actuator 114, thereby pulling the first pair of legs 124 and the second pair of legs 126 together. This motion, also decompresses the biasers 128 until, as shown in FIGS. 3-4, the biasers 128 have little or no stored potential energy when the creeper 100 is in the raised position.

By contrast, FIGS. 5-6 respectively illustrate front and rear perspective views of the creeper 100 at a lowered position in accordance with one or more examples of the present disclosure. In particular, at a lowered position, the creeper 100 includes a third angle 502. Like the first angle 130 shown in FIG. 2 (and the second angle 302 of FIG. 3), the third angle 502 is also defined by a position of the seat 102 and the backrest 104. Different from both previous angles shown in FIGS. 1-4, however, the third angle 502 is comparatively greater. In particular, the backrest 104 at the third angle 502 is reclined all the way back to a flat or approximately flat configuration. The first pair of legs 124 and the second pair of legs 126 are also folded flat.

In some examples, the third angle 502 comprises a maximum or most open angle positionable within a range of motion for the creeper 100. In particular examples, the third angle 502 is about 150 degrees to about 210 degrees. In specific implementations, the third angle 502 is about 170 degrees to about 190 degrees.

As further shown in FIGS. 5-6, the creeper 100 at the lowered position includes a third height 504. Like the first height 132 shown in FIG. 2 (and the second height 304 shown in FIG. 3), the third height 504 is also defined by a position of the seat 102 relative to a ground surface. However, the third height 504 of the creeper 100 is comparatively lower than both the former seat heights of the creeper 100 shown in FIGS. 1-4.

In some examples, the third height 504 comprises a minimum or lowest seat height positionable within a range of motion for the creeper 100. In particular examples, the third height 504 is about 2 inches to about 1.5 feet. In specific implementations, the third height 504 is about 4 inches to about 10 inches.

In some embodiments, the foregoing angle ranges and height ranges are not mere design choices. At least the foregoing angle ranges and height ranges can be important in certain scenarios (e.g., so that a user laying on the creeper 100 in a supine position can fit within tighter workspaces and comfortably work on objects having a lower ground clearance). Also, the foregoing angle ranges and height ranges can allow ground clearance of the adjustment assembly 112 positioned underneath the seat 102 and the backrest 104.

Albeit not shown in FIGS. 5-6, the biasers 128 are compressed when the creeper 100 is in the lowered position. The actuatable shaft (also not shown) of the actuator 114 has extended out of the housing of the actuator 114, thereby pushing the first pair of legs 124 and the second pair of legs 126 apart. This motion compresses the biasers 128, thereby storing potential energy therein when the creeper 100 is at the lowered position.

Any of the features, components, and/or parts, including the arrangements and configurations thereof shown in FIGS. 1-6 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 1-6.

Figure 7:
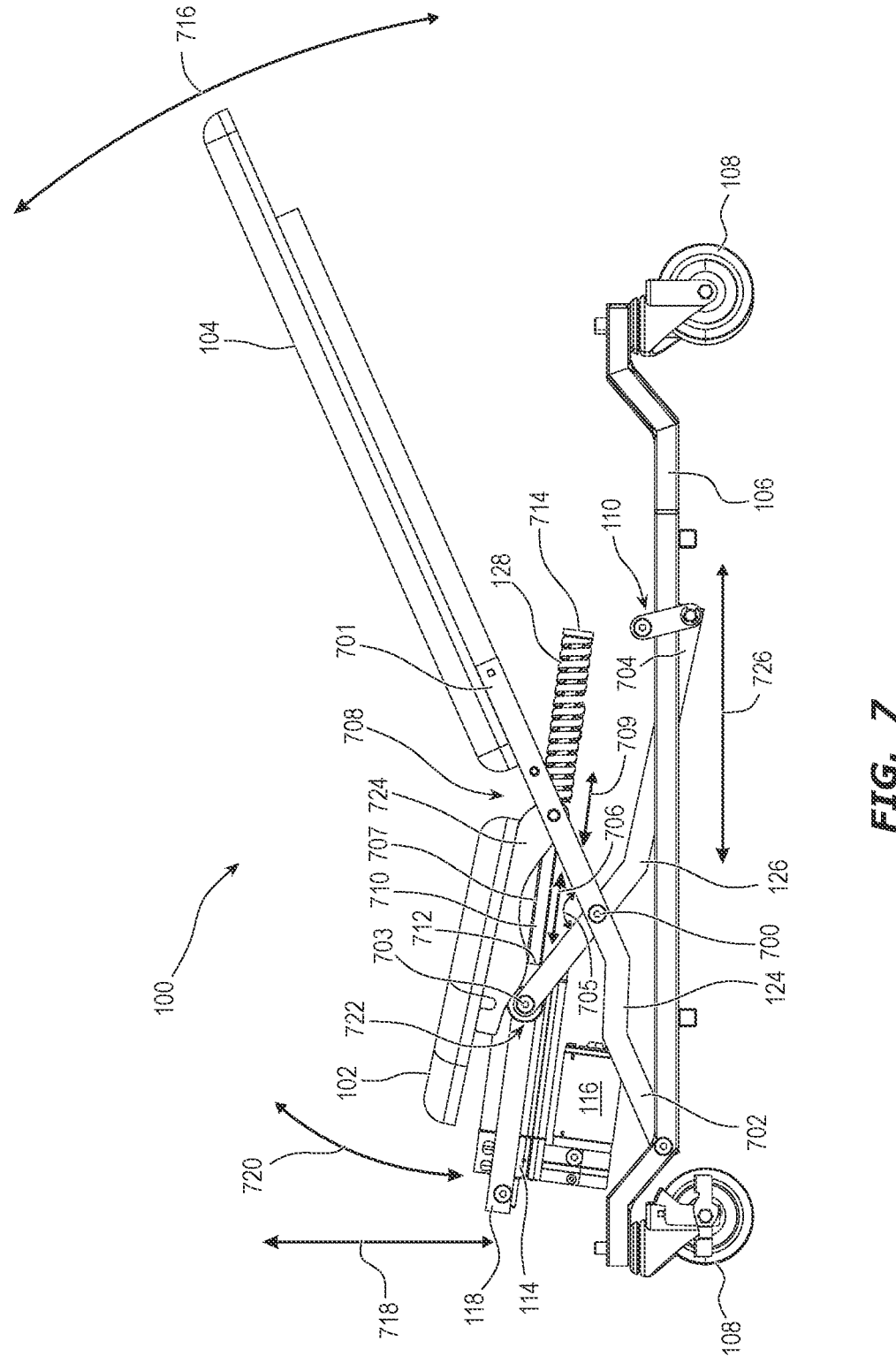
FIG. 7 illustrates a side view of an example creeper.

FIG. 7 illustrates a side view of the creeper 100 in accordance with one or more examples of the present disclosure. As shown, the creeper 100 is positioned between a lowered position and a raised position discussed above. In addition, the battery mount(s) 120 and switches 122 are omitted for purposes of illustration.

In particular, FIG. 7 illustrates an example configuration of the pairs of legs. Being a side view, only a single leg of the first pair of legs 124 and a single leg of the second pair of legs 126 are shown. In the depicted configuration, the first pair of legs 124 comprises a first end 701 connected to the backrest 104, and a second end 702 opposite the first end 701. The second end 702 can be rotatably anchored to the base frame 106. Similarly, the second pair of legs 126 comprises a first end portion 703 and a second end portion 704 opposite the first end portion 703. In some examples, the first end portion 703 includes a roller that can engage (e.g., contact, abut, roll along, etc.) a cam surface of a seat support member 724. Additionally, in certain examples, the second end portion 704 can connect to the movable axle 110 of the base frame 106.

In these or other examples, each leg of the first pair of legs 124 and each leg of the second pair of legs 126 can be respectively joined together at a scissor connection 700, thereby forming a scissor angle 705 at each joint. As used herein, the term "scissor connection" refers to a cross-linkage or cross-joint between two discrete members that can pivot relative to each other such that the two members can draw closer together or farther apart. Some examples of a scissor connection include a pivot intersection between members generally forming an "X," "T" or "+" shaped configuration. In certain examples, the members forming a scissor connection are independently pivotable about the scissor connection. In other examples, the members forming a scissor connection pivot simultaneously about the scissor connection in a dependent fashion.

Relatedly, the term "scissor angle" refers to an angle between two members forming a scissor connection. In some examples, a scissor angle of interest is defined by an angle between the first end 701 of the first pair of legs 124 and a first end portion 703 of the second pair of legs 126.

The various components of the creeper 100 can move in myriad different ways. However, to move the first pair of legs 124 and the second pair of legs 126 in a scissor fashion, the creeper 100 can include certain types of motion for specific components. In so doing, the creeper 100 can articulate (e.g., adjust in height and/or angle) to various positions discussed above.

To illustrate, an actuatable shaft 707 (positioned laterally behind one of the set of dowels 710 in this view) can actuate in and out of the actuator 114 along directions 706. As used herein, the term "actuatable shaft" refers to a piston rod housed within the actuator 114 that, upon actuation, can extend outward and away from the actuator 114 or retract inward and towards the actuator 114. In these or other examples, the actuatable shaft 707 is attached to a connector 708 (more clearly shown in FIG. 8), which transfers this actuation motion to push apart or pull together the first pair of legs 124 and the second pair of legs 126, as will be discussed below.

As used herein, the term "connector" refers to a movable joint extending between the first pair of legs 124 (e.g., adjacent to a gap between the seat 102 and the backrest 104). In particular, a connector can link certain members together (e.g., the seat support member 724 and each leg of the first pair of legs 124). Additionally or alternatively, a connector can slide along one or more other members. For example, the connector 708 defines a pair of through holes penetrated by a set of dowels 710. In these or other examples, the connector 708 can translate along the set of dowels 710 in directions 709 in response to the actuatable shaft 707 extending outwards or retracting inwards along the same direction 706. In so doing, the connector 708 can bias the biasers 128 when the adjustment assembly 112 transitions from the raised position to the lowered position (e.g., to compress the biasers 128 upon extension of the actuatable shaft 707 away from actuator 114). In contrast, the connector 708 can unbias the biasers 128 when the adjustment assembly 112 transitions from the lowered position to the raised position (e.g., to decompress the biasers 128 upon retraction of the actuatable shaft 707 towards the actuator 114).

In particular examples, the connector 708 separates the biasers 128 and the actuatable shaft 707. Specifically, in certain examples, the biasers 128 are positioned underneath the backrest 104, while the actuatable shaft 707 is positioned underneath the seat 102. By being separately positioned underneath the backrest 104, the biasers 128 include an opposite kinematic relationship to the actuatable shaft 707 of the actuator 114. Specifically (and as more clearly shown in subsequent figures), the biasers 128 can compress when the actuatable shaft 707 extends outward from the actuator 114, and the biasers can decompress when the actuatable shaft 707 retracts into the actuator 114. This opposing kinematic relationship differs from typical shock-like suspension springs that surround a piston and therefore compress down or decompress up together with the respective up/down motion of the piston.

Moreover, this opposing kinematic relationship can help decrease a peak load of the actuator 114, which is typically when transitioning the creeper 100 from a lowered position to a raised position. That is, at the lowered position, the actuatable shaft 707 (which extends between the first pair of legs 124 and the second pair of legs 126) may be extended out a farthest distance from the actuator housing because the first pair of legs 124 and the second pair of legs 126 are also separated by a farthest distance. Thus, being kinematically opposite the actuatable shaft 707, the biasers 128 can assist the inward pull of the actuatable shaft 707 to transition the creeper 100 from the lowered position by pushing against the connector 708. In these or other examples, the biasers 128 would be unable to do so if positioned around the actuatable shaft 707 itself in a conventional suspension-like manner.

As mentioned, the set of dowels 710 extend through the connector 708. As used herein, the terms "dowel" or "support rod" refer to a rigid bar, pole, or peg. In particular embodiments, the set of dowels 710 comprises a sliding surface for engaging the connector 708. Additionally, in certain embodiments, the set of dowels 710 retain the biasers 128. For instance, the set of dowels 710 may be positioned inside the biasers 128. In particular, the set of dowels 710 can be positionally aligned with a longitudinal central axis of the biasers 128. Additionally or alternatively, the biasers 128 can rest upon set of dowels 710 in an off-axis manner (particularly when unbiased or loose when the creeper 100 is in the raised position). Further, and as mentioned above, the biasers 128 can be limited to a single biaser. In which case, the set of dowels 710 can also be limited to a single dowel (or more than two dowels, depending on the number of biasers 128).

In some embodiments, each dowel of the set of dowels 710 comprises a fixed end 712, and a free end with a mechanical stop 714. In these or other examples, the fixed end 712 is attached to the bracket 118. For instance, the fixed end 712 is inserted into and welded to interior sidewalls of the bracket 118. Further, the mechanical stop 714 can include an object with a surface area or diameter greater than the set of dowels 710 and the biasers 128. In this manner, the mechanical stop 714 can include an abutment face to contact the biasers 128 and prevent further displacement thereof. In these or other examples, the connector 708 can compress the biasers 128 against the mechanical stop 714.

Other movable components can include the movable axle 110. In these or other examples, the movable axle 110 can translate along the base frame 106 in directions 726. For instance, as the second pair of legs 126 actuates, the movable axle 110 can correspondingly translate in one of the directions 726 along the base frame 106. That is, the second end portion 704 of the second pair of legs 126 can be drawn towards a front or back portion of the creeper 100, thereby inducing movement of the movable axle 110 via a roller attachment that can roll along the base frame 106.

Based on actuation of the first pair of legs 124 and the second pair of legs 126, the seat 102 and the backrest 104 can correspondingly adjust in terms of height and/or angle. To illustrate, the backrest 104 can rotate in an arcuate fashion along directions 716. Similarly, the seat 102 and the backrest 104 can adjust a height up or down (e.g., vertically relative to a ground surface) along directions 718. In addition, the seat 102 can rotate in tilt directions 720.

The various ways in which the tilt of the seat 102 can be adjusted in the tilt directions 720 is discussed further below in relation to FIGS. 9-12. For example, a roller 722 positioned on the first end portion 703 can engage a seat support member 724. As used herein, the term "seat support member" refers to a supporting structure for the seat 102.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIG. 7.

Figure 8:
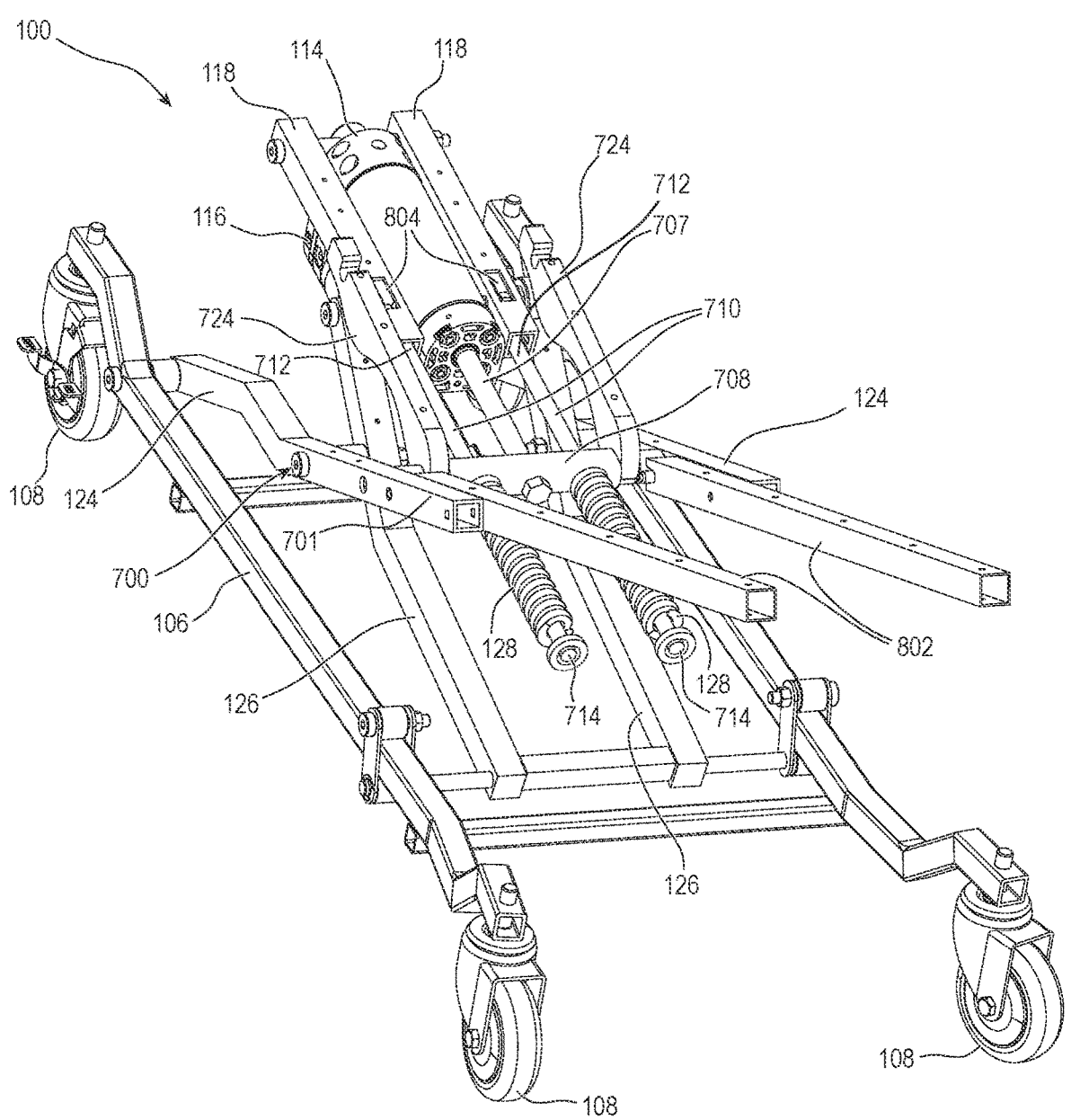
FIG. 8 illustrates another rear perspective view of an example creeper with components beneath a seat and backrest exposed.

FIG. 8 illustrates a rear perspective view of the creeper 100 in accordance with one or more examples of the present disclosure. In particular, FIG. 8 omits the battery mount(s) 120, the seat 102, and the backrest 104 for illustration purposes. As shown, the creeper 100 can include backrest support members 802. The backrest support members 802 can attach to the first end 701 of the first pair of legs 124 and extend along at least a portion of the backrest length (not shown).

Additionally shown in FIG. 8, the bracket 118 adjacent to at least one of actuator 114 or the motor 116 can include apertures 804. The apertures 804 can be defined by one or more sidewalls in each bracket 118. In these or other examples, the apertures 804 are sized and shaped for one or more tools to attach the fixed end 712 of the set of dowels 710 to the bracket 118. For example, the apertures 804 are sized and shaped to allow a welding tool to be sufficiently close to the fixed end 712 inside the bracket 118 such that a welding process can occur. Additionally or alternatively, the apertures 804 may be sized and shaped to allow one or more fasteners that can connect the fixed end 712 to the bracket 118. Still, in other embodiments, the apertures 804 may be omitted. In such a case, the fixed end 712 of the set of dowels 710 can engage (e.g., interlock with or otherwise fasten to) the bracket 118.

At another end of the bracket 118 opposite the apertures 804, the bracket 118 can mount to at least one of the actuator 114 or the motor 116. In some examples, the bracket 118 is positioned parallel to the actuatable shaft 707. In certain instances, the bracket 118 can impart increased strength and/or structural integrity by aligning with the set of dowels 710 in a manner coplanar with the actuatable shaft 707.

FIG. 8 further shows a view of the connector 708. The actuatable shaft 707 can be connected to a central part or portion of the connector 708. For example, the actuatable shaft 707 extends through the connector 708 and attaches to a fastener (e.g., a nut) on the opposite side of the connector 708. Adjacent to the actuatable shaft 707, the set of dowels 710 also extend through the connector 708 (e.g., via through holes). However, the set of dowels 710 are not attached to the connector 708 in a fixed manner. Rather, as mentioned above, the connector 708 can slide along the set of dowels 710 as the actuatable shaft 707 pushes or pulls the connector 708.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIG. 8.

Figure 9:
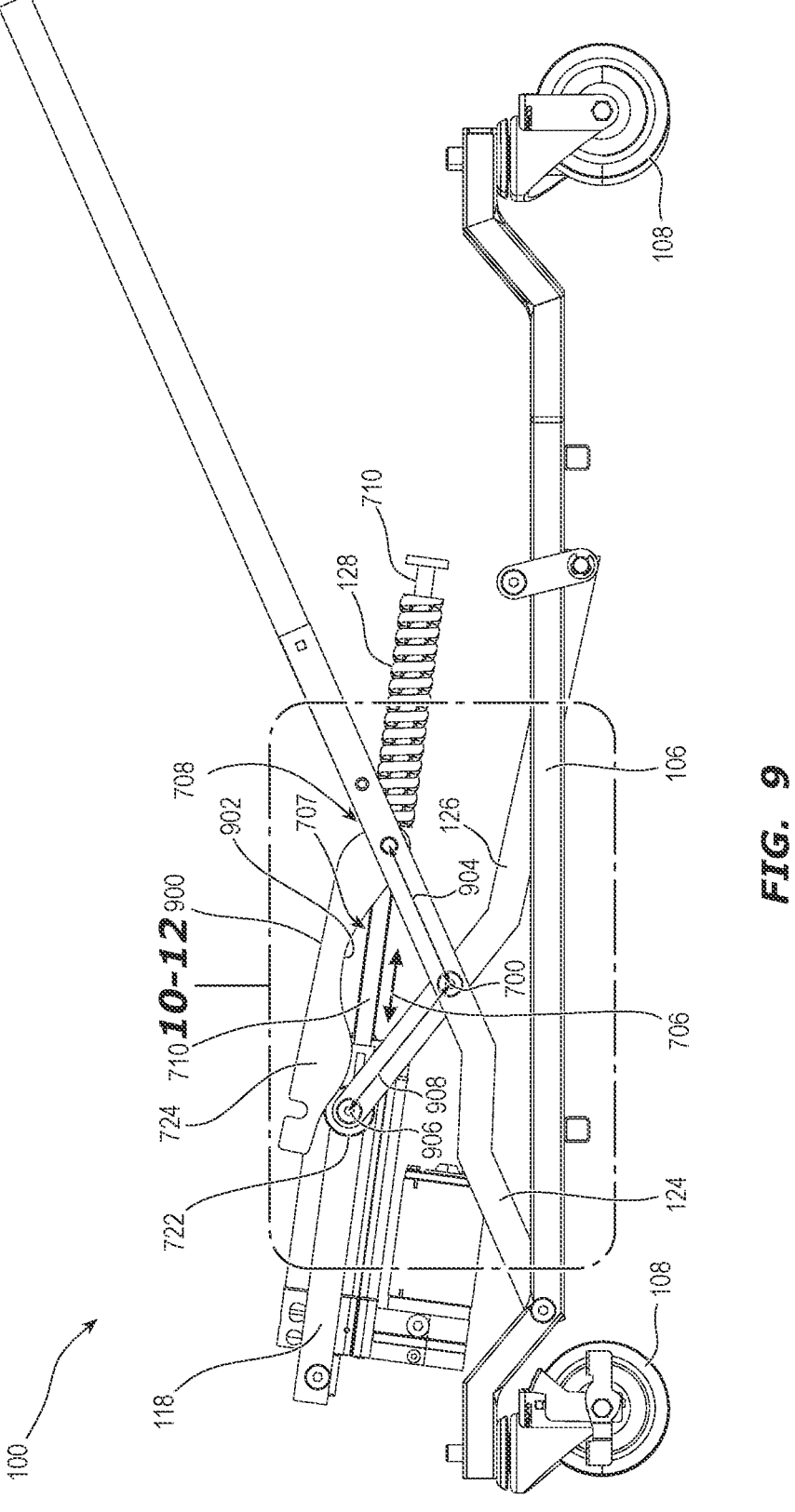
FIG. 9 illustrates another side view of an example creeper.

FIG. 9 illustrates another side view of the creeper 100 in accordance with one or more examples of the present disclosure. The battery mount(s) 120, the seat 102, and the backrest 104 are omitted for illustration purposes in FIG. 9. In particular, FIG. 9 illustrates a close-up view indicator for certain partial views depicted in subsequent FIGS. 10-12. These subsequent figures will discuss articulation of the seat 102.

By way of introduction to such seat articulation, however, FIG. 9 illustrates the seat support member 724 of the creeper 100 comprising a seat surface 900 and a cam surface 902 opposite the seat surface 900. The seat surface 900 is arranged to contact or attach to the seat 102 (not shown). In particular implementations, the seat surface 900 is sufficiently planar, smooth, or flat for an even contact surface to the seat 102 comprising at least one of a rigid seat backing, a foam layer, upholstery, etc.

By contrast, the cam surface 902 is arranged to contact the roller 722. As used herein, the term "cam surface" refers to an engagement surface that can induce articulation of a seat. In particular, the cam surface 902 can include an uneven surface (e.g., with wave-like contours). In response to engagement with the roller 722, the seat support member 724 can correspondingly articulate (as will be discussed further below in relation to FIGS. 10-12). That is, a top surface of the seat 102 (not shown) can include a variable angle relative to the backrest 104 (also not shown) based on engagement between the roller 722 and the cam surface 902.

It will be appreciated that the cam surface 902 can be advantageous in some embodiments because seat articulation can be automatically induced when raising or lowering the creeper 100 (e.g., without separate user manipulation). Such seat articulation can also correspond to a position of the backrest 104 (e.g., so as to better support a user positioned on the seat 102 at varying backrest positions).

Additionally, the cam surface 902 is but one example of an articulation mechanism for the seat 102. Another example of an articulation mechanism includes a 4-bar linkage. Still, other examples of an articulation mechanism can include reverse motion linkages, parallel motion linkages, crank and slider linkages, bell crank linkages, six-bar linkages, etc. Thus, as used herein, the term "articulation mechanism" refers to one or more components (including component surfaces or component appendages) that when engaged or actuated can cause the seat 102 to articulate (e.g., adjust an angle of seat inclination).

Further shown in FIG. 9, the first pair of legs 124 can comprise a moment arm 904. The moment arm 904 can be defined by a distance between the scissor connection 700 and a central axis of the connector 708 through which actuation and biasing forces can act (e.g., from the push-pull forces of the actuatable shaft 707 and the biasers 128). In these or other examples specifically, the biasers 128 can be positionally arranged to provide a return bias against the actuatable shaft 707 via a spring force applied at the moment arm 904 away from the scissor connection 700.

Relatedly, the first end portion 703 of the second pair of legs 126 is connected to the bracket 118 at a pivot point 906 positioned a distance 908 away from the scissor connection 700. In these or other examples, the distance 908 can be equivalent to the moment arm 904 (e.g., to provide a congruent scissor action of both the first pair of legs 124 and the second pair of legs 126). In alternative implementations, however, the distance 908 is not equivalent to the moment arm 904 (e.g., to intentionally induce an incongruent scissor action between the first pair of legs 124 and the second pair of legs 126).

Any of the features, components, and/or parts, including the arrangements and configurations thereof shown in FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIG. 9.

Figure 10:
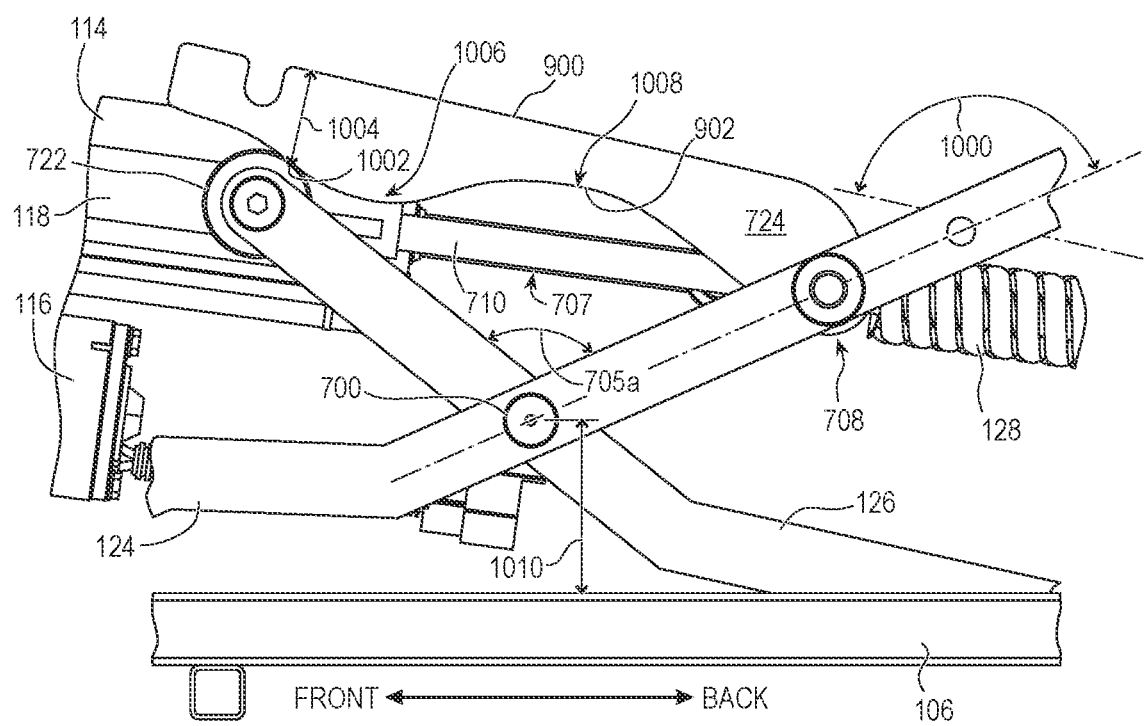
FIGS. 10-12 illustrate examples of roller engagement with a cam surface for seat articulation.
Figure 11:
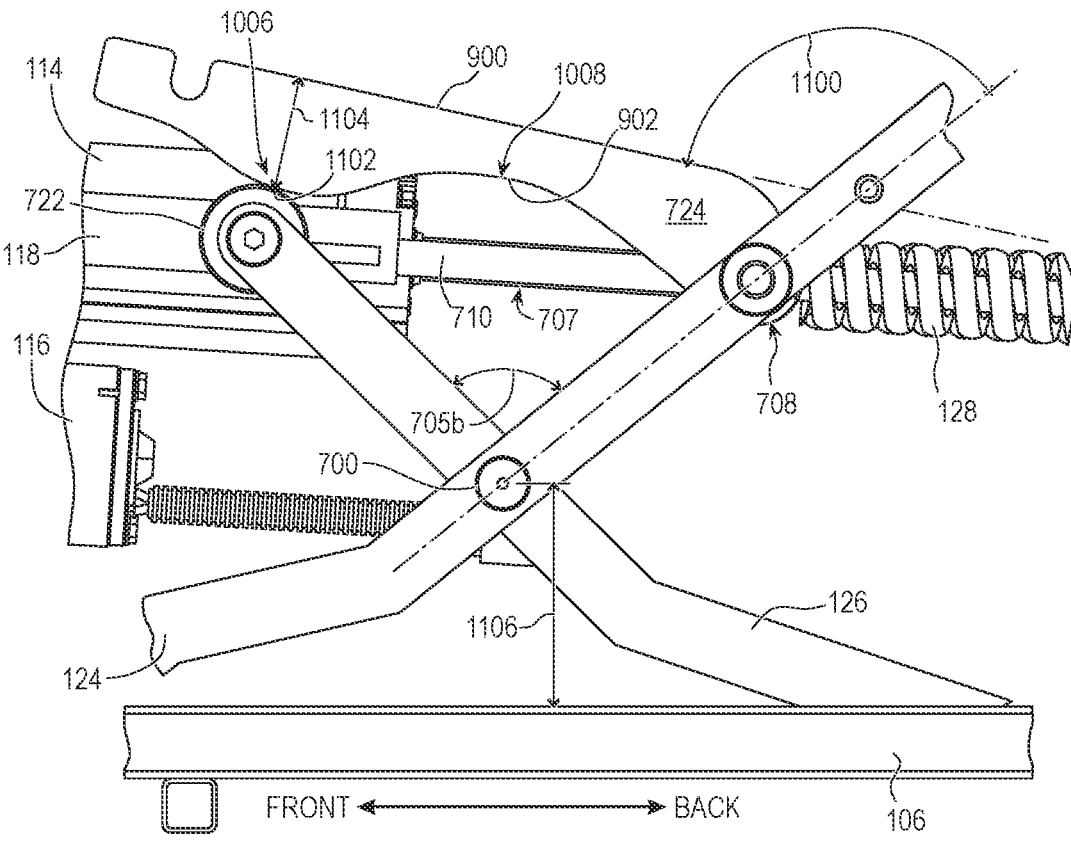
Figure 12:
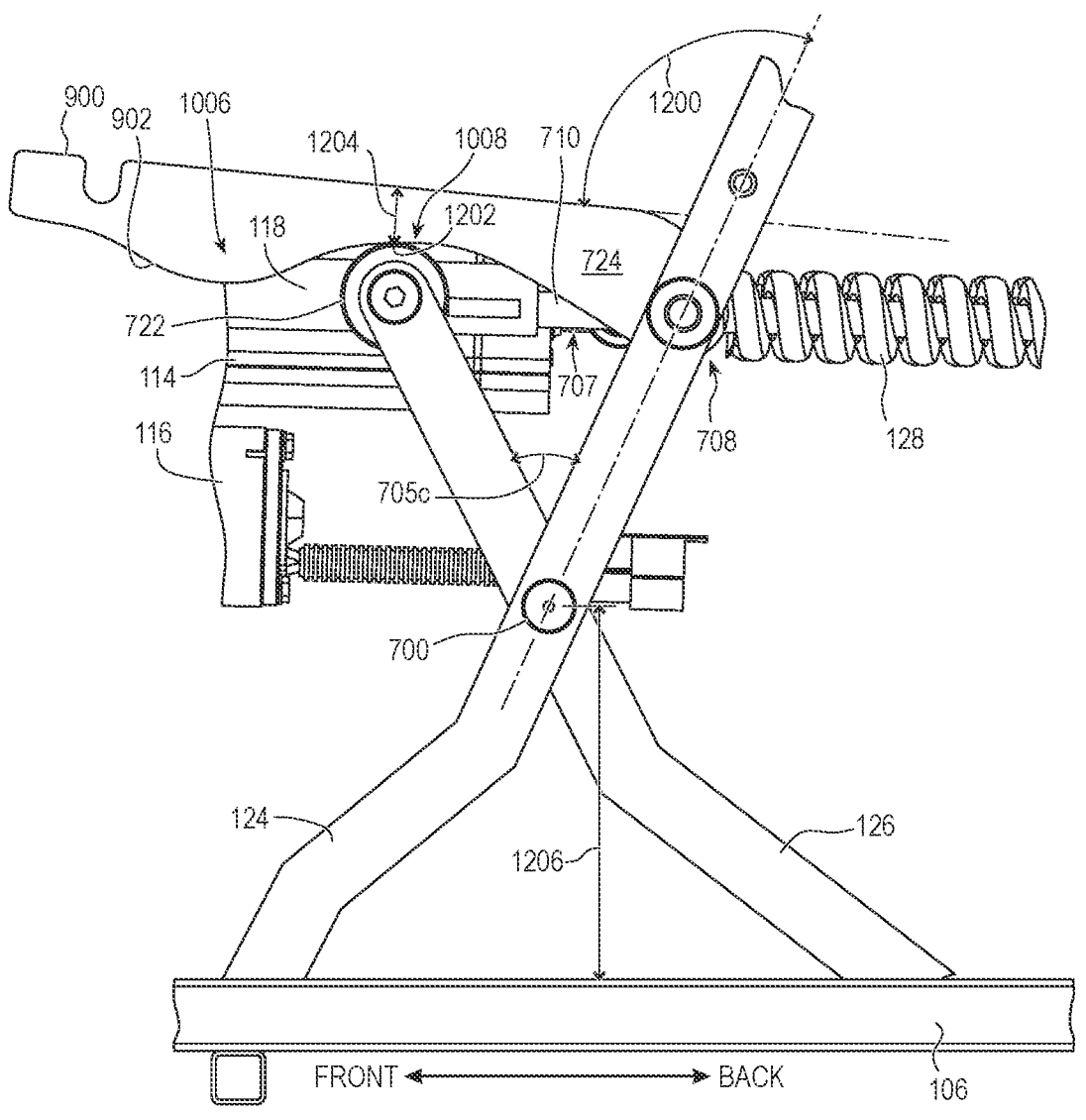

FIGS. 10-12 illustrate examples of roller engagement with a cam surface for seat articulation in accordance with one or more embodiments of the present disclosure. As shown, in FIG. 10, the roller 722 is positioned towards the front of the seat support member 724. This frontward positioning along the cam surface 902 can correspond to the creeper 100 being positioned at or near the lowered position (e.g., with a seat angle discussed below between about 140 degrees and about 190 degrees). The depicted compression of the biasers 128 also indicate such a lower positioning of the creeper 100.

As the creeper 100 is raised up from a lowered position, the roller 722 can traverse the cam surface 902 in a front-to-back motion. This motion of traversal by the roller 722 is depicted in FIGS. 10-12. By contrast, as the creeper 100 is lowered from the raised position, the roller 722 can traverse the cam surface 902 in a back-to-front motion. It will be appreciated that the foregoing engagement between the roller 722 and the cam surface 902 can occur automatically as the first pair of legs 124 and the second pair of legs 126 are actuated. In this manner, seat articulation can also occur automatically as the creeper 100 is adjusted.

In FIG. 10, the scissor connection 700 comprises a scissor connection height 1010 and a corresponding scissor angle 705a between the roller end (i.e., the first end portion 703) of the second pair of legs 126 and the backrest end (i.e., the first end 701) of the first pair of legs 124. As will be apparent in subsequent figures, the scissor angle and the scissor connection height can both change as the first pair of legs 124 and the second pair of legs 126 actuate.

Likewise, as the roller 722 engages the cam surface 902, a seat angle can also change. As used herein, the term "seat angle" refers to an angle formed between the seat 102 and the backrest 104. A seat angle can also refer to an angle formed between one or more members corresponding to the seat 102 and/or the backrest 104. For example, a seat angle 1000 is defined by the angled formed between the seat surface 900 and a central axis through the first pair of legs 124.

In these or other examples, a seat angle (e.g., the seat angle 1000) corresponds to a position of the roller 722 along the cam surface 902. Specifically, a seat angle of the creeper 100 corresponds to a point of contact (e.g., a point of contact 1002) for the roller 722 relative to a crest portion 1006 or a trough portion 1008 of the cam surface 902. As used herein, the term "point of contact" refers to a position along the cam surface 902 where the roller 722 abuts the cam surface 902.

Relatedly, the term "crest portion" refers to an area of the cam surface 902 where a distance (e.g., a distance 1004) between the seat surface 900 and the cam surface 902 is larger than other areas compared to an average or median distance (or thickness) of the seat support member 724. Additionally or alternatively, a crest portion can correspond to the wave-like peak areas or convex humps of the cam surface 902.

By contrast, the term "trough portion" refers to an area of the cam surface 902 where a distance (e.g., the distance 1004) between the seat surface 900 and the cam surface 902 is smaller than other areas compared to an average or median distance (or thickness) of the seat support member 724. Additionally or alternatively, a trough portion can correspond to the wave-like basins or concave low-regions of the cam surface 902.

FIG. 11 illustrates the creeper 100 comprising a seat angle 1100. In this example configuration, the seat angle 1100 (e.g., between about 120 degrees and about 160 degrees) is comparatively steeper than the seat angle 1000 of FIG. 10 when the creeper 100 is positioned at or near a lowered position. Thus, when the roller 722 engages the crest portion 1006, the seat 102 and the backrest 104 can be positioned between the lowered position and the raised position. In certain implementations, the induced steeper seat angle corresponding to the roller positioning at the crest portion 1006 can advantageously provide better user support and/or help to keep users from sliding off the creeper 100 at intermediate positions when the backrest 104 is at an inclined angle.

It will be appreciated that this seat articulation can be a function of actuating the first pair of legs 124 and the second pair of legs 126. For example, as the actuatable shaft 707 pulls the first pair of legs 124 and the second pair of legs 126 together, the scissor angle lessens from the scissor angle 705a (shown in FIG. 10) to a scissor angle 705b shown in FIG. 11. As the scissor angle lessens, the scissor connection height also increases (e.g., to a scissor connection height 1106), and the roller 722 further engages the cam surface 902.

In particular, FIG. 11 depicts the roller 722 having traversed backwards along the cam surface 902 from the point of contact 1002 in FIG. 10 to a point of contact 1102 that corresponds to the crest portion 1006. There, at the crest portion 1006, a distance between the point of contact 1102 and the seat surface 900 comprises a distance 1104, which is comparatively greater than the distance 1004 in FIG. 10. Further, as shown in FIG. 11, when the roller 722 engages the crest portion 1006, the seat 102 (or in this case, the seat support member 724) comprises an inclined angle greater (or steeper) than both of a first angle corresponding to the lowered position and a second angle corresponding to the raised position.

FIG. 12 illustrates the creeper 100 comprising a seat angle 1200 associated with a raised position. In this example configuration, the seat angle 1200 (e.g., between about 90 degrees and about 140 degrees) is comparatively steeper than the seat angle 1000 of FIG. 10 and the seat angle 1100 of FIG. 11. In particular, FIG. 12 depicts the roller 722 having traversed further backwards along the cam surface 902 from the point of contact 1102 in FIG. 11 to a point of contact 1202 that corresponds to the trough portion 1008. There, at the trough portion 1008, a distance between the point of contact 1202 and the seat surface 900 comprises a distance 1204, which is comparatively less than the distance 1004 in FIG. 10 and the distance 1104 in FIG. 11.

By advancing the roller 722 into the trough portion 1008, the seat support member 724 itself can automatically level out more or lower the angle of inclination towards a horizontal plane. Articulating the seat 102 in this manner can provide a comfortable transition as the backrest 104 becomes more steeply inclined (and where users are also less prone to sliding off the creeper 100).

FIG. 12 further shows the scissor connection 700 positioned at a scissor connection height 1206. The scissor connection height 1206 is greater than the scissor connection heights 1010, 1106 respectively shown in FIGS. 10-11.

Alternatively to the foregoing embodiments, it will be appreciated that other methods of articulating the seat can be implemented. For instance, the creeper 100 can alternatively include a 4-bar linkage to articulate the seat 102 as the creeper 100 adjusts in height. The 4-bar linkage can similarly include ranges of motion with higher and lower traversal paths to induce coordinated seat tipping based on creeper height and/or backrest angle in ways similar to those discussed above.

Any of the features, components, and/or parts, including the arrangements and configurations thereof shown in FIGS. 10-12 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 10-12.

FIGS. 13-24 illustrate additional views of the creeper 100 in accordance with one or more examples of the present disclosure. Various aspects discussed above may be viewed in these different perspectives and, in certain cases, with increased clarity of illustration.

Figure 13:
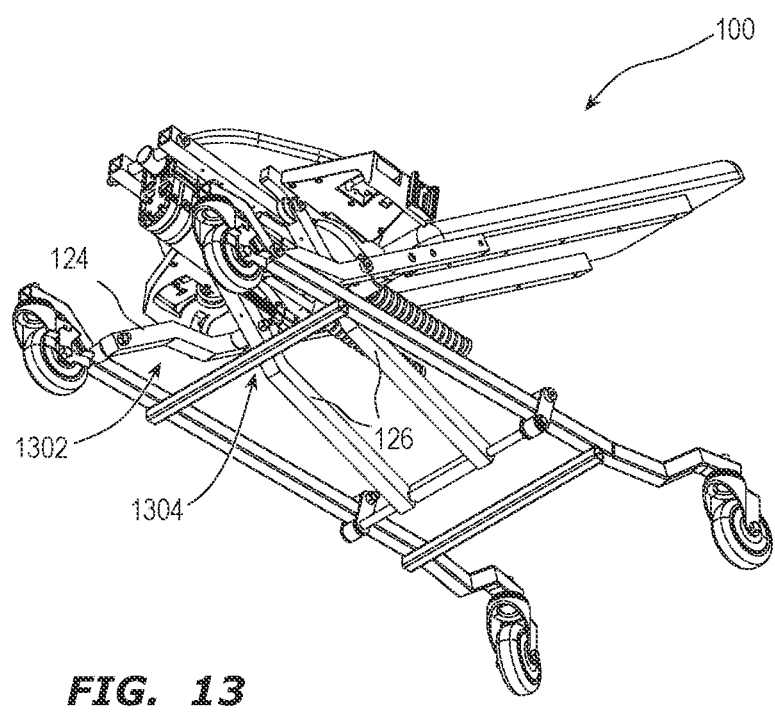
FIGS. 13-14 respectively illustrate bottom front perspective and bottom rear perspective views of an example creeper.
Figure 14:
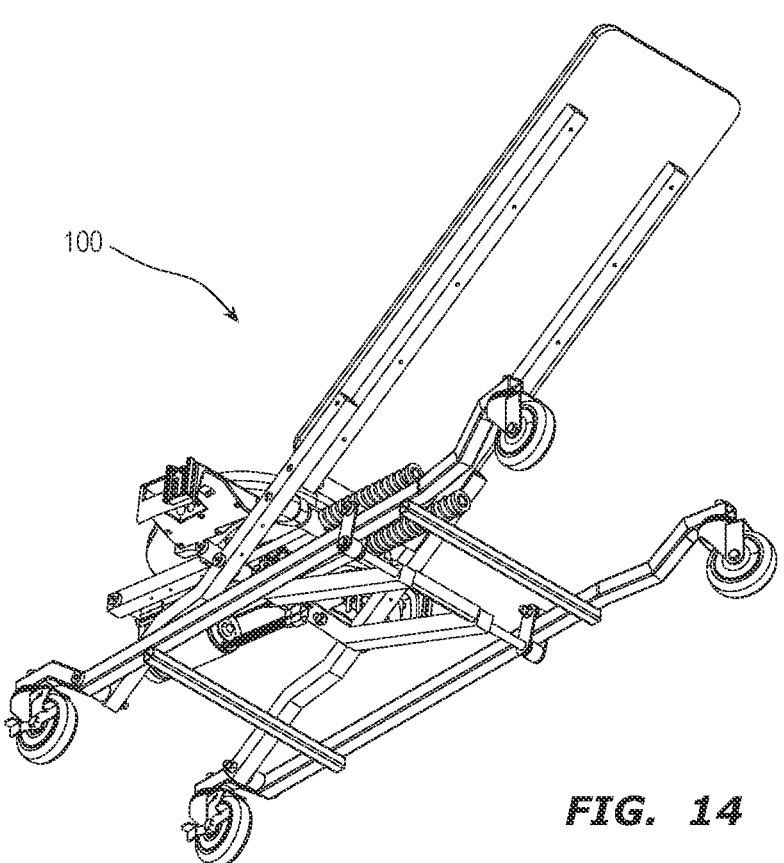
Figure 15:
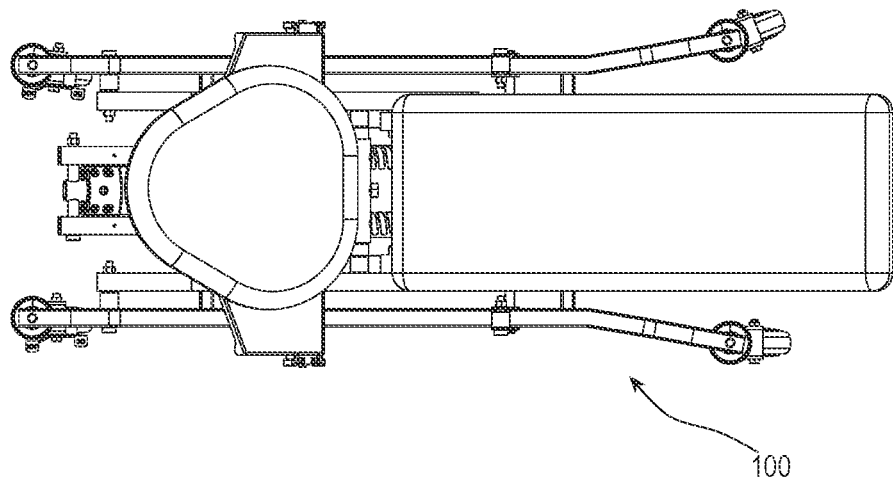
FIGS. 15-16 respectively illustrate a top profile view and a bottom profile view of an example creeper.
Figure 16:
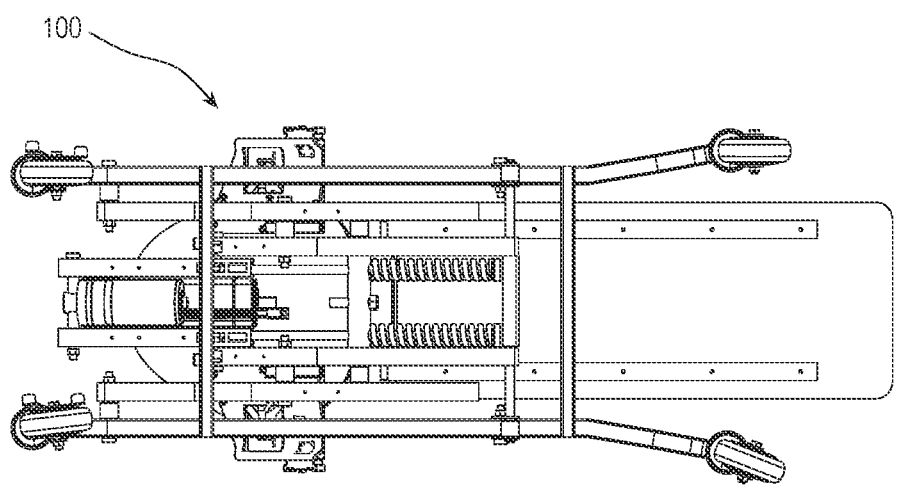
Figure 17:
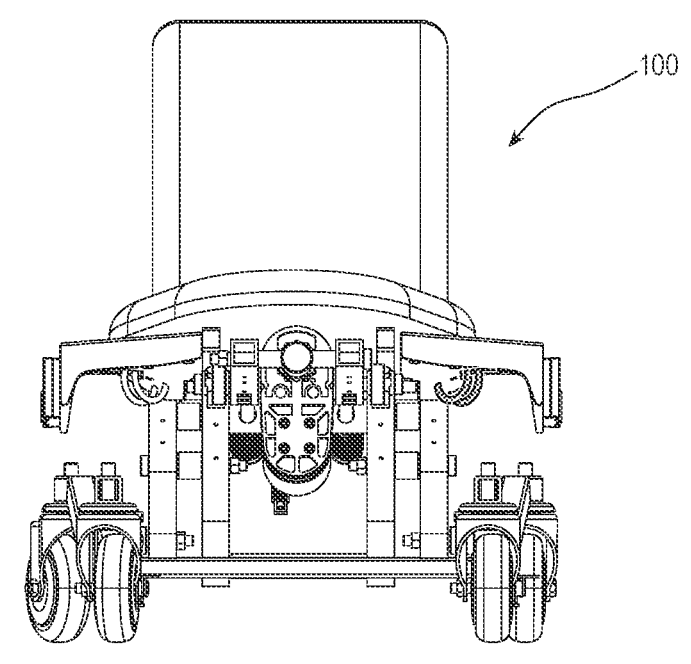
FIGS. 17-18 respectively illustrate a front profile view and a rear profile view of an example creeper.
Figure 18:
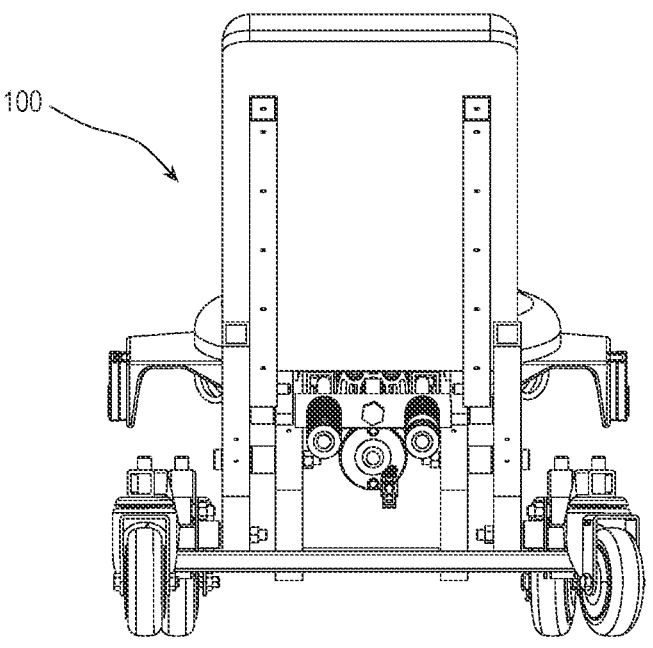
Figures 19, 20:
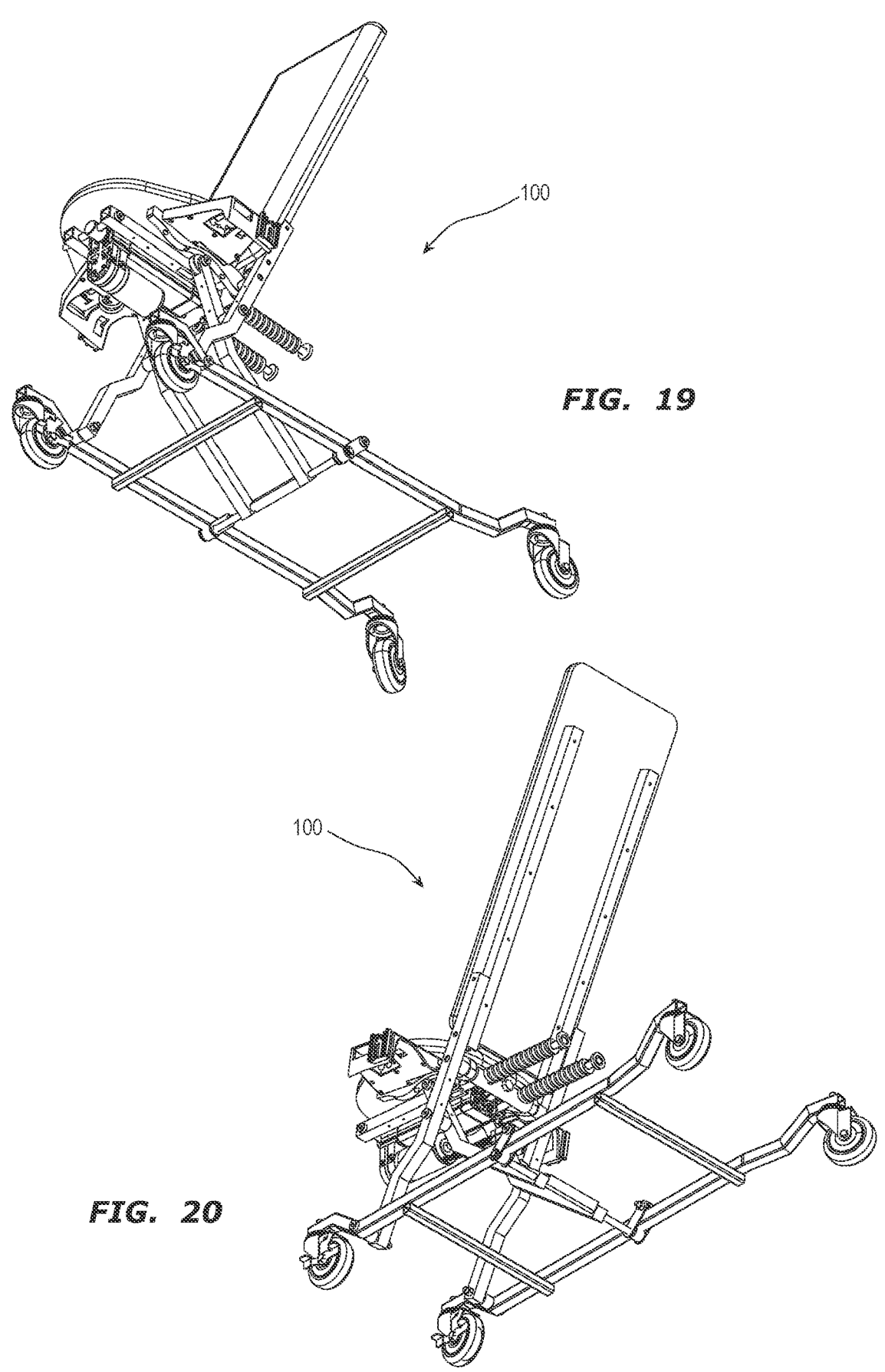
FIGS. 19-20 respectively illustrate bottom front perspective and bottom rear perspective views of an example creeper in a raised position.
Figure 21:
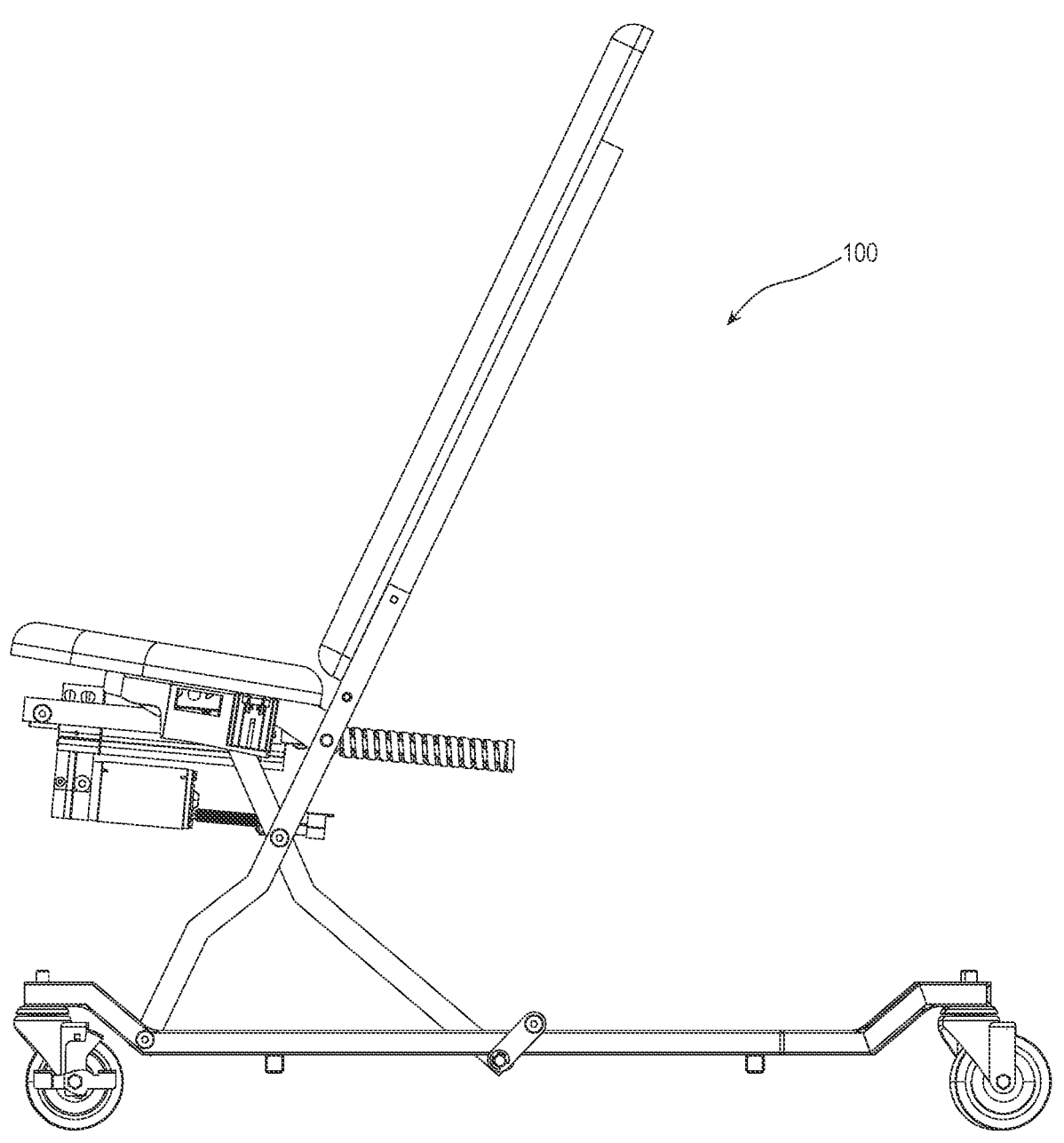
FIG. 21 illustrates a side profile view of an example creeper in a raised position.
Figure 22:
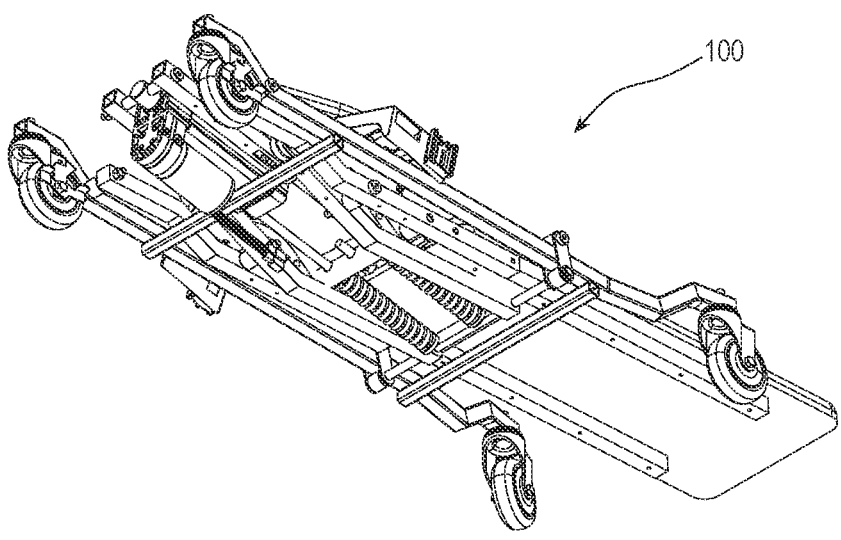
FIGS. 22-23 respectively illustrate bottom front perspective and bottom rear perspective views of an example creeper in a lowered position.
Figure 23:
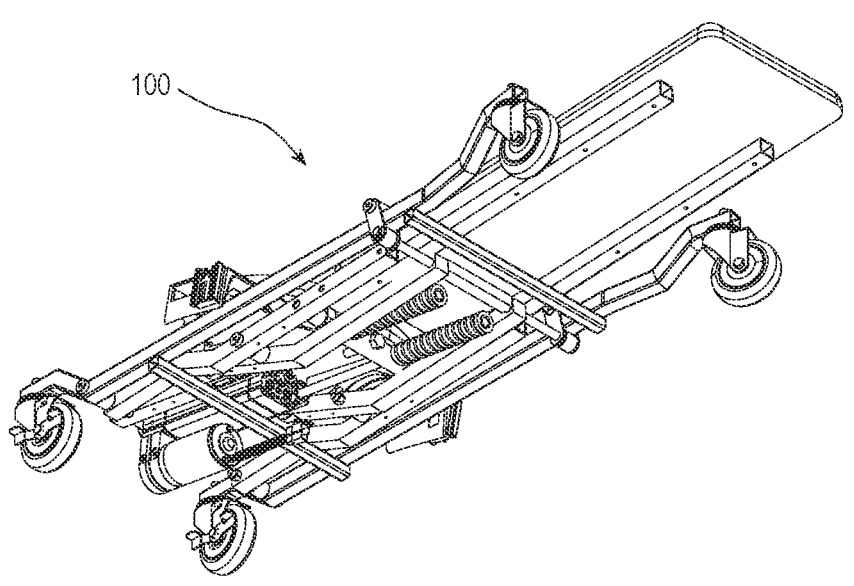
Figure 24:
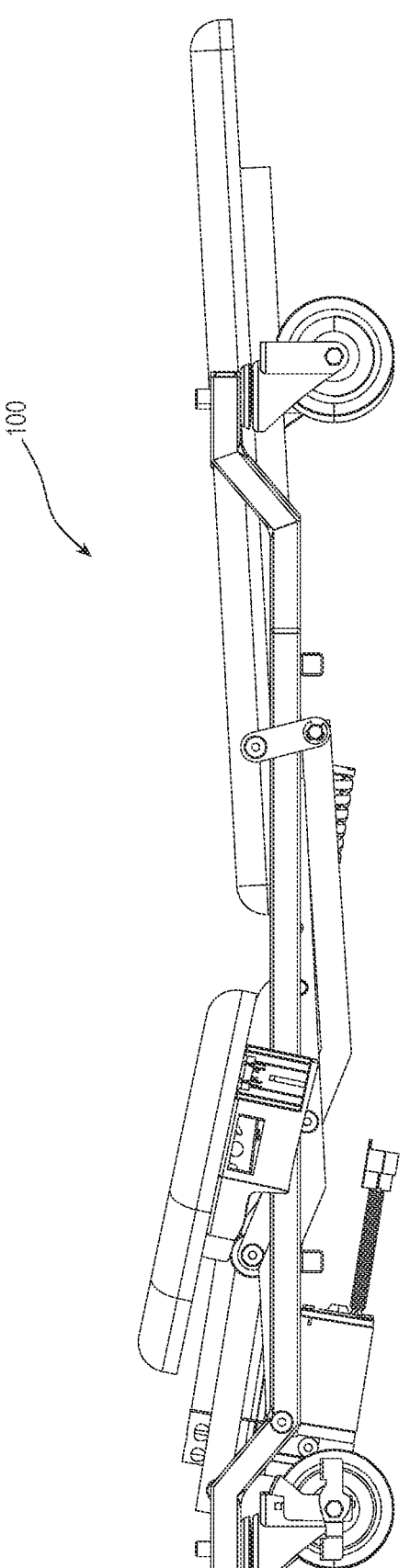
FIG. 24 illustrates a side profile view of an example creeper in a lowered position.

In these or other examples, the creeper 100 can include directionally-varied portions in the pairs of legs (also referred to as support members). These directionally-varied portions can include bends, curved portions, shaped portions, plateaued regions, etc. For instance, as shown in FIG. 13, each leg of the first pair of legs 124 comprises a bend 1302, and each leg of the second pair of legs 126 comprises a bend 1304. In particular embodiments, the bends 1302, 1304 can allow the first pair of legs 124 and the second pair of legs 126 to fold flatter for the lowered position, thereby lending to a shorter height profile as may be desired in tighter workspaces.

Further, in some embodiments, the creeper 100 of the present disclosure can include a member spacing devoid of pinch points. For example, the creeper 100 includes a gap between each member of the creeper 100. To illustrate, the creeper 100 can include at least a one-inch gap between each member of the creeper 100. In some embodiments, the creeper 100 includes certain connections or fasteners that can facilitate such a member-spacing. For instance, the movable axle 110 can be attached to rollers along the base frame 106 via snap rings or (other suitable fastener) that can maintain a spacing between adjacent members, particularly in the lowered position of the creeper 100.

Additionally, it will be appreciated that the present disclosure is not limited to embodiments in which the creeper 100 includes an actuator. Indeed, certain alternative embodiments that fall within the scope of the present disclosure include creepers devoid of an actuator. In such embodiments, the creeper can include the same or similar elements discussed above, including a cam surface for automatic seat articulation as the creeper adjusts up or down. Additionally or alternatively, a no-actuator creeper can include biasers that function in tandem with a scissor lift as similarly discussed above (e.g., to spring-load the creeper when in the lowered position).

Any of the features, components, and/or parts, including the arrangements and configurations thereof shown in FIGS. 13-24 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 13-24.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not intended to be exhaustive or to limit the examples to the precise forms disclosed.

It will be apparent to one of ordinary skill in the art that many modifications and variations are possible in view of the above teachings. Indeed, various inventions have been described herein with reference to certain specific aspects and examples. However, they will be recognized by those skilled in the art that many variations are possible without departing from the scope and spirit of the inventions disclosed herein. Specifically, those inventions set forth in the claims below are intended to cover all variations and modifications of the inventions disclosed without departing from the spirit of the inventions. The terms "including" or "includes" as used in the specification shall have the same meaning as the term "comprising."

What is claimed is:

1. An adjustable creeper, comprising:
a seat comprising a seat support member with a cam surface;
a backrest;
a base frame comprising:
four wheels; and
a movable axle; and
an adjustment assembly comprising a continuous range of adjustment resolution to adjust the seat and the backrest from a lowered position to a raised position, the adjustment assembly comprising:
an actuator assembly configured for motorized actuation;
a first pair of legs, comprising:
a first end connected to the backrest; and
a second end opposite the first end, the second end being rotatably anchored to the base frame; and
a second pair of legs, comprising:
a first end portion comprising a roller configured to engage the cam surface of the seat support member; and
a second end connected to the movable axle of the base frame.

2. The adjustable creeper of claim 1, wherein the cam surface comprises a crest portion and a trough portion.

3. The adjustable creeper of claim 2, wherein when the roller engages the crest portion, the seat and the backrest are positioned between the lowered position and the raised position.

4. The adjustable creeper of claim 2, wherein when the roller engages the crest portion, the seat comprises a steeper angle than at least a first angle corresponding to the lowered position.

5. The adjustable creeper of claim 1, wherein the actuator assembly comprises:
a bracket;
a hydraulic actuator positioned between the bracket;
a motor electrically coupled to the hydraulic actuator;
at least one spring; and
at least one dowel disposed within the at least one spring.

6. The adjustable creeper of claim 5, wherein each dowel of the set of dowels comprises:
a fixed end connected to the bracket; and
a free end comprising a mechanical stop.

7. The adjustable creeper of claim 5, wherein each first end portion of the second pair of legs is connected to the bracket.

8. The adjustable creeper of claim 5, further comprising a movable joint extending between the first pair of legs, the movable joint defining a through hole penetrated by the at least one dowel.

9. The adjustable creeper of claim 8, wherein the movable joint is translatable along the at least one dowel to:
bias the at least one spring when the adjustment assembly transitions from the raised position to the lowered position; and
unbias the at least one spring when the adjustment assembly transitions from the lowered position to the raised position.

10. An apparatus, comprising:
a seat;
a backrest;
a base frame comprising wheels; and
an adjustment assembly adjustable from a lowered position to a raised position, the adjustment assembly comprising:
an actuator assembly, comprising:
an actuator positioned underneath the seat, the actuator comprising an actuatable shaft; and
biasers positioned underneath the backrest;
pairs of scissor legs; and
a connector attached to the pairs of scissor legs and the actuatable shaft, the connector being configured to:
compress the biasers upon extension of the actuatable shaft away from the actuator; and
decompress the biasers upon retraction of the actuatable shaft towards the actuator.

11. The apparatus of claim 10, wherein the actuator assembly comprises:
an actuator mount connected to the actuator; and
a set of dowels positioned inside the biasers and extending to the actuator mount.

12. The apparatus of claim 11, wherein the set of dowels extend through the connector, the connector separating the biasers and the actuatable shaft.

13. The apparatus of claim 11, wherein:
the actuatable shaft is actuatable in and out of a first end of the actuator; and
the actuator mount is connected to a second end of the actuator opposite the first end, the actuator mount being parallel to the actuatable shaft.

14. The apparatus of claim 10, wherein each scissor leg of the pairs of scissor legs comprises a single, continuous support member.

15. The apparatus of claim 10, wherein the actuator assembly further comprises a motor connected to the actuator, the motor being positioned underneath the actuator between the actuator and a ground surface.

16. An apparatus, comprising:
a seat comprising an articulation mechanism;
a backrest;
a base assembly comprising:
a front portion;
a back portion; and
a movable axle translatable along the base assembly between the front portion and the back portion;
an electrically powered actuator assembly, comprising:
a hydraulic actuator comprising an adjustable shaft;
a motor;
a bracket positioned adjacent to each side of at least one of the hydraulic actuator or the motor, the bracket supporting at least one end of the hydraulic actuator or the motor opposite the adjustable shaft;
a set of support rods connected to the bracket; and
raise-assist members comprising central axes positionally aligned with the set of support rods; and
a support assembly movably attached to the seat, the backrest, the base assembly, and the electrically powered actuator assembly, the support assembly comprising:
a first pair of support members positioned parallel to each other, each support member of the first pair of support members comprising:
a first end connected to the backrest; and a second end opposite the first end, the second end being rotatably connected to the front portion of the base assembly; and a second pair of support members positioned parallel to each other and forming a scissor connection with the first pair of support members, each support member of the second pair of support members, comprising:

a first end connected to the bracket; and a second end connected to the movable axle.

17. The apparatus of claim 16, wherein:

the articulation mechanism comprises cammed portions on a bottom surface of the seat; and each support member of the second pair of support members comprises a roller attached to the first end, the roller configured to engage one of the cammed portions.

18. The apparatus of claim 17, wherein the seat comprises a top surface with a variable angle relative to the backrest based on engagement between the rollers and the cammed portions.

19. The apparatus of claim 16, wherein the raise-assist members are configured to provide a return bias against the adjustable shaft via a spring force applied at a moment arm away from the scissor connection.

20. The apparatus of claim 19, wherein the first end of the second pair of support members is connected to the bracket at a pivot point positioned a distance away from the scissor connection, the distance being equivalent to the moment arm.

\* \* \* \* \*